(12) United States Patent
Jesse et al.

(10) Patent No.: US 8,384,020 B2
(45) Date of Patent: Feb. 26, 2013

(54) SPATIALLY RESOLVED THERMAL DESORPTION/IONIZATION COUPLED WITH MASS SPECTROMETRY

(75) Inventors: Stephen Jesse, Knoxville, TN (US);
Gary J. Van Berkel, Clinton, TN (US);
Olga S. Ovchinnikova, Knoxville, TN (US)

(73) Assignees: UT-Battelle, LLC, Oak Ridge, TN (US);
University of Tennessee Research Foundation, Knoxville, TN (US)

( * ) Notice: Subject to any disclaimer, the term of this patent is extended or adjusted under 35 U.S.C. 154(b) by 25 days.

(21) Appl. No.: 12/890,225

(22) Filed: Sep. 24, 2010

(65) Prior Publication Data

US 2012/0074306 A1 Mar. 29, 2012

(51) Int. Cl.
*H01J 49/00* (2006.01)
(52) U.S. Cl. ............................ 250/282; 250/281; 850/50
(58) Field of Classification Search ................ 850/5, 13, 850/50, 63; 250/281, 282, 288
See application file for complete search history.

(56) References Cited

U.S. PATENT DOCUMENTS

| | | | | |
|---|---|---|---|---|
| D82,802 | S * | 12/1930 | Disney | D21/656 |
| 4,747,698 | A * | 5/1988 | Wickramasinghe et al. | 374/6 |
| 6,095,679 | A * | 8/2000 | Hammiche et al. | 374/43 |
| 6,353,219 | B1 * | 3/2002 | Kley | 250/234 |
| 6,405,137 | B1 * | 6/2002 | Reading | 702/22 |
| 7,488,603 | B2 | 2/2009 | Gjerde et al. | |
| 7,544,933 | B2 | 6/2009 | Cooks et al. | |
| 2002/0110177 | A1 * | 8/2002 | Nakayama et al. | 374/44 |
| 2002/0171037 | A1 | 11/2002 | Ellson et al. | |
| 2003/0010911 | A1 * | 1/2003 | Palmer et al. | 250/306 |
| 2003/0190757 | A1 | 10/2003 | Furuno et al. | |
| 2007/0164216 | A1 * | 7/2007 | Fedorov | 250/309 |
| 2007/0220996 | A1 * | 9/2007 | Cole | 73/866.5 |
| 2008/0315092 | A1 * | 12/2008 | Kley | 250/307 |
| 2009/0159790 | A1 * | 6/2009 | Kostiainen et al. | 250/282 |
| 2009/0321626 | A1 | 12/2009 | Vertes et al. | |
| 2009/0321629 | A1 | 12/2009 | Plows et al. | |
| 2010/0107284 | A1 * | 4/2010 | Shigeno et al. | 850/5 |
| 2010/0115672 | A1 * | 5/2010 | Mirkin et al. | 850/19 |
| 2010/0229263 | A1 * | 9/2010 | Vertes et al. | 850/9 |
| 2011/0041223 | A1 * | 2/2011 | Jesse et al. | 850/5 |

(Continued)

OTHER PUBLICATIONS

Price, D, et al.. Localised Evolved gas analysis by micro-thermal analysis. Journal of Thermal Analysis and Calorimetry, vol. 64 (2001) 309-314.*

(Continued)

*Primary Examiner* — David A Vanore
*Assistant Examiner* — Wyatt Stoffa
(74) *Attorney, Agent, or Firm* — Novak Druce Connolly Bove + Quigg LLP

(57) ABSTRACT

A system and method for sub-micron analysis of a chemical composition of a specimen are described. The method includes providing a specimen for evaluation and a thermal desorption probe, thermally desorbing an analyte from a target site of said specimen using the thermally active tip to form a gaseous analyte, ionizing the gaseous analyte to form an ionized analyte, and analyzing a chemical composition of the ionized analyte. The thermally desorbing step can include heating said thermally active tip to above 200° C., and positioning the target site and the thermally active tip such that the heating step forms the gaseous analyte. The thermal desorption probe can include a thermally active tip extending from a cantilever body and an apex of the thermally active tip can have a radius of 250 nm or less.

19 Claims, 12 Drawing Sheets

U.S. PATENT DOCUMENTS

| | | | |
|---|---|---|---|
| 2011/0107473 A1* | 5/2011 | Carpick et al. | 850/59 |
| 2011/0113516 A1* | 5/2011 | Fink et al. | 850/9 |
| 2011/0207473 A1* | 8/2011 | Swaminathan et al. | 455/456.1 |
| 2011/0253903 A1* | 10/2011 | Sun et al. | 250/426 |
| 2012/0053065 A1* | 3/2012 | Van Berkel | 506/7 |

OTHER PUBLICATIONS

Price, D, et al., Micro-thermal analysis thermal microscopy and localized thermal analysis, International Journal of Pharaceutics 192 (1999) 85-96.*

Ovchinnikova, O., "Spatially Resolved Laser and Thermal Desorption/Ionization Coupled with Mass Spectrometry." PhD diss., University of Tennessee, 2011.*

AnaSys finest financial messaging .Fully qualifies SWIFT interface. AnaSys Messagemanager is the easy all-in-one solution for SWIFT, SIC, SECOM.© 2010 Switzerland. http://www.anasys.com. p. 1.

Price et al. I. Micro-Thermal analysis and evolved gas analysis. Thermochimica Acta 367-368 (2001) 195-202 Received Sep. 27, 1999.

Novotny, L; Stranick, J. "Near-field optical microscopy and spectroscopy with pointed probes." Annu. Rev. Phys. Chem. 57. 303-331 (2006).

Schmitz, T.; Gamez, G.; Setz, P.; Zhu, L., Zenobi, R. "Towards nanoscale molecular analysis at atmospheric pressure by a near-field laser ablation ion trap/time-of-flight mass spectrometer." Anal. Chem. 2008, 80, 6537-6544.

Craig, D.; Kett, V.; Andrews, C.; Royal, P.; "Pharmaceutical Applications of Micro-Thermal Analysis." J. Pharm. Science. 2002, 91, 1201-1213.

Park, K.; Lee, J.; Bhargava, R.; King, W. "Routine femtogram-level chemical analyses using vibrational spectroscopy and self-cleaning scanning probe microscopy tips."Anal. Chem., 80, 3221-3228 (2008).

Cody, R.B.; Laramee, J. A.; Durst, H. D. "Versatile New Ion Source for the Analysis of Materials in Open Air under Ambient Conditions." Anal. Chem. 2005, 77, 2297-2302.

McEwen, C. N.; Gutteridge, S. "Analysis of the Inhibition of the Ergosterol Pathway in Fungi Using the Atmospheric Solids Analysis Probe (ASAP) Method." J. Am. Soc. Mass Spectrom. 2007, 18, 1274-1278.

Mrksich, M. "Mass Spectrometry of Self-Assembled Monolayers: A New Tool for Molecular Surface Science." ACS Nano. 2008, 2, 7-18.

Shibue, T. "Analysis of Self-Assembled Monolayers by Thermal Desorption Mass Spectrometry: Neighborhood Interaction and Hydrogen/Deuterium Exchange." Anal. Sci. 2004, 20, 1223-1225.

Bruker Corporation. Bruker AFM Probes. A pack of Thermal probes Wollaston Wire probes. Mounted for Explorer/Caliber AFMs.http://www.veecoprobes.com/p-3215-1610-00.aspx . © 2010 ; p. 1.

Asemblon The Gold Standard in Self Assembly. Highest purity thiols for self-assembly. http://www.asemblon.com/2008. p. 1.

Price et al. . New Adventures in thermal analysis. Journal of Thermal Analysis and Calorimetry, vol. 60 (2000) 723-733.

Price et al. Micro-thermal analysis: scanning thermal microscopy and localised thermal analysis. International Journal of Pharmaceutics 192 (1999) 85-96. Received Mar. 23, 1999.School of Physics & Chemistry, Lancaster University, Lancaster, UK.

Price et al. . Localised Evolved gas analysis by micro-thermal analysis. Journal of Thermal Analysis and Calorimetry, vol. 64 (2001) 309-314. Received 2001.United Kingdom.

Price et al. Micro-Thermal Analysis of Polymers: Current Capabilities and Future Prospects. Macromol. Symp. 2001, 167, 45-62. Received 2001; United Kingdom.

Craig et al.. The use of micro-thermal analysis as a means of in situ characterisation of a pharmaceutical tablet coat. Thermochimica Acta 380 (2001) 165-173. Received 2001. United Kingdom.

The International Search report and The Written Opinion of the International Searching Authority mailed Jan. 17, 2012. In corresponding application No. PCT/US2011/052925.

Su et al. "Using MALDI-TOF Mass Spectrometry to Characterize Interfacial Reactions on Self-Assembled Monolayers." Langmuir 2003, 19 (12), pp. 4867-4870 (May 2003) (Letter).

Pohl et al. "Optical stethoscopy: image recording with resolution λ/20." Appl. Phys. Lett 44, 651 (1984).

Larsen et al. "Order in Microcontact Printed Self-Assembled Monolayers." J. Am. Chem. Soc., Apr. 1997 119 (13) pp. 3017-3026.

Todd et al. "Organic ion imaging of biological tissue with secondary ion mass spectrometry and matrix-assisted laser desorption/ionization." Journal of Mass Spectrometry, 36: 355-369 (Apr. 2001).

Bell et al. "Penning ionization by metastable helium atoms." 1968 J. Phys. B: At. Mol. Phys. 1 18.

Williams et al. "Rapid accurate mass desorption electrospray ionisation tandem mass spectrometry of pharmaceutical samples." Rapid Commun. Mass Spectrom 2005; 19: 3643-3650.

Love et al. "Self-Assembled Monolayers of Thiolates on Metals as a Form of Nanotechnology." Chem. Rev., 2005, 105 (4), pp. 1103-1170 (Mar. 2005).

Winograd, Nicholas, "The Magic of Cluster SIMS." Analytical Chemistry 2005 77 (7), 142 A-149 A.

Stöckle et al. "Nanoscale Atmospheric Pressure Laser Ablation-Mass Spectrometry." Anal. Chem., 2001, 73 (7), pp. 1399-1402.

Haapala et al. "Desorption Atmospheric Pressure Photoionization." Anal. Chem., 2007 79 (20), pp. 7867-7872.

Van Berkel et al. "Established and emerging atmospheric pressure surface sampling/ionization techniques for mass spectrometry." Journal of Mass Spectrometry, 2008 43: 1161-1180.

Kwon et al. "Fast displacement and structural transition of cyclohexanethiol self-assembled monolayers by octanethiols on Au (111)." Ultramicroscopy. Sep. 2008;108 (10):1311-4. Epub May 10, 2008.

Delamarche et al. (1996), "Golden interfaces: The Surface of Self-Assembled Monolayers." Advanced Materials, 8: 719-729.

Kertesz et al. (2008), "Improved imaging resolution in desorption electrospray ionization mass spectrometry." Rapid Communications in Mass Spectrometry, 22: 2639-2644.

Cornett et al. "MALDI imaging mass spectrometry: molecular snapshots of biochemical systems." Nature Methods 4, 828-833 (2007).

Song et al. (2006), Atmospheric pressure ion/molecule reactions for the selective detection of nitroaromatic explosives using acetonitrile and air as reagents. Rapid Communications in Mass Spectrometry, 20: 3130-3138.

Giessibl, Franz J. (2003) "Advances in atomic force microscopy." Rev. Mod. Phys. 75, 949-983 Letter.

Yang et al. "Analysis of Self-Assembled Monolayer Interfaces by Electrospray Mass Spectrometry: A Gentle Approach." Anal. Chem, 2003, 75, 6741-6744.

McEwen et al. "Analysis of Solids, Liquids, and Biological Tissues Using Solids Probe Introduction at Atmospheric Pressure on Commercial LC/MS Instruments." Analytical Chemistry 2005 77 (23), 7826-7831.

Moini, M., "Atmospheric Pressure Chemical Ionization: Principles, Instrumentation, and Applications." In Encyclopedia of Mass Spectrometry (vol. 6, pp. 344-354). Elsevier, (2007).

Synge, E.H. (1928) "XXXVIII. A suggested method for extending microscopic resolution into the ultra-microscopic region." Philosophical Magazine Series 7, 6: 35, 356-362.

Benninghoven, A. (1994), "Chemical Analysis of Inorganic and Organic Surfaces and Thin Films by Static Time-of-Flight Secondary Ion Mass Spectrometry (TOF-SIMS)." Angewandte Chemie International Edition in English, 33: 1023-1043.

Benninghoven et al. "Secondary Ion Mass Spectrometry, SIMS VIII. Proceedings of the Eights International Conference on Secondary Ion Mass Spectrometry (SIMS VIII)." Journal of Chemical Education 1993 70 (1), A25.

* cited by examiner

SPATIALLY RESOLVED THERMAL DESORPTION/IONIZATION COUPLED WITH MASS SPECTROMETRY

STATEMENT REGARDING FEDERALLY SPONSORED RESEARCH

This invention was made with government support under Contract No. DE-AC05-00OR22725 awarded by the U.S. Department of Energy. The government has certain rights in this invention.

FIELD OF THE INVENTION

This invention is drawn to systems and methods for high spatial-resolution analysis of the chemical composition of a specimen, in particular, those that include thermal desorption of an analyte.

BACKGROUND OF THE INVENTION

Advances in analytical technology have pushed the limit of human understanding of chemical and physical phenomena. This is certainly the case in the study of materials and systems in the nanoscale range. New tools create the opportunity for the new discoveries. Currently available techniques that allow nanometer, i.e., sub-micron, resolution evaluations are limited in the amount of chemical information they can provide. Techniques such as electron microscopy and scanning probe microscopy (SPM), which allow for spatial imaging resolution of 1 nm or better, provide almost no chemical information about the sample. Alternatively, techniques like RAMAN and IR imaging provide some limited molecular level chemical information. Mass spectrometry-based techniques that provide precise molecular mass and chemical structure information can in some cases provide chemical information at the submicron level. However, those techniques are currently limited to operation in high vacuum and often involve highly specialized sample preparation techniques.

SUMMARY OF THE INVENTION

A method and system for analyzing a chemical composition of a specimen is described. The system can include a specimen stage for supporting a specimen, a thermal desorption probe, a collection device arranged to capture an gaseous analyte desorbed from a specimen by the thermal desorption probe, an analytical instrument for determining a chemical composition of an analyte, and a stepper mechanism configured to provide relative motion between the specimen stage and the thermal desorption probe. The thermal desorption probe can include a thermally active tip extending from a cantilever body and an apex of the thermally active tip can have a radius of 250 nm of less. An outlet of the collection device can be coupled to an inlet of the analytical instrument. In addition, the system can include a controller configured for (i) actuating the stepper mechanism to sequentially articulate the thermal desorption probe and/or the sample stage along a predetermined sampling path comprising a plurality of target sites, and (ii) heating the thermally active tip to a temperature greater than 200° C. while proximate the target site in order to cause analytes at the plurality of target sites to form gaseous analytes.

The controller can be configured for causing the stepper mechanism to bring the thermal desorption probe into contact with a specimen at each of the target sites. The controller can be configured for removing the thermal desorption probe from contact with a specimen while the thermal desorption probe is articulated along the sampling path. The controller can be controller for articulating the thermal desorption probe along the sampling path in a non-contact mode. The system according to claim 12, wherein said analytical instrument is a mass spectrometer, an ionization source, a separation method, or a combination thereof.

The invention also includes a method of analyzing a chemical composition of a specimen. The method can include providing a specimen for evaluation and a thermal desorption probe, thermally desorbing an analyte from a target site of the specimen using the thermally active tip to form a gaseous analyte, ionizing the gaseous analyte to form an ionized analyte, and analyzing a chemical composition of said ionized analyte. The thermally desorbing step can include heating the thermally active tip to above 200° C., and positioning the target site and the thermally active tip such that the heating step forms the gaseous analyte.

The method can also include determining a predetermined sampling path comprising a plurality of target sites prior to the first thermal desorption step, and sequentially articulating the thermally active tip along the predetermined sampling path and repeating the thermally desorbing, ionizing and analyzing steps for each target site. The determining step can include analyzing a topography of the specimen utilizing the thermal desorption probe in an atomic force microscopy mode.

BRIEF DESCRIPTION OF THE DRAWINGS

A fuller understanding of the present invention and the features and benefits thereof will be obtained upon review of the following detailed description together with the accompanying drawings, in which.

DETAILED DESCRIPTION OF THE INVENTION

Figure 1A:
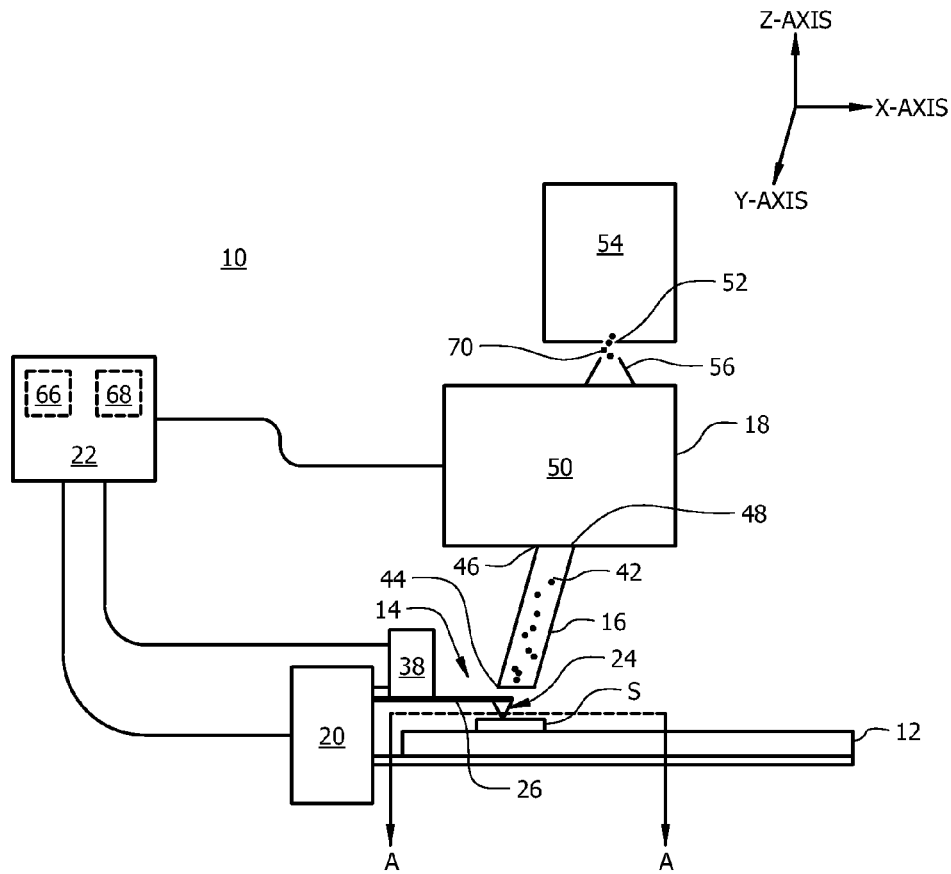
FIG. 1(a) is a schematic of a system according to the invention, and 1(b) is a close up of FIG. 1(a) showing the gap between the thermal desorption probe and the collection device.

The present invention is directed to systems and methods for high spatial-resolution analysis of the chemical composition of a specimen. In particular, systems capable of achieving sub-micron resolution utilizing thermal desorption of a specimen. The systems and methods described herein can also include providing topographic, mechanical, and chemical mapping of the surface of the specimen. It is noted that like and corresponding elements mentioned herein and illustrated in the figures are generally referred to by the same reference numeral. It is also noted that proportions of various elements in the accompanying figures are not drawn to scale to enable clear illustration if elements having smaller dimensions relative to other elements having larger dimensions.

As shown in FIG. 1, the system 10 for analyzing a chemical composition of a specimen (S) can include a sample stage 12 for supporting the specimen (S), a thermal desorption probe 14, a collection device 16, an analytical instrument 18, a stepper mechanism 20, and a controller 22. The stepper mechanism 20 can be configured to move the specimen stage 12 and the thermal desorption probe 14 relative to one another.

The thermal desorption probe 14 can include a thermally active tip 24 extending from a cantilever body 26. The thermally active tip 24 can include a distal that has a conical shape with a rounded tip. The apex of the thermally active tip 24 can have a radius of 250 nm or less, or 100 nm or less, or 75 nm or less, or 50 nm or less, or 30 nm or less, or 15 nm or less. The thermally active tip 24 can be in communication with a heating mechanism such that the thermally active tip 24 can be heated to a temperature of at least 200° C., at least 250° C., at least 300° C., at least 350° C., at least 400° C., at least 450° C., or at least 500° C..

The heating mechanism can be a voltage source 28 connected to a resistive heating circuit coupled to the thermal desorption probe 14. In such an example, the voltage source can be electrically coupled to the resistive heating circuit of the thermal desorption probe 14 and the thermally active tip 24 can be heated via resistive heating.

In another example, the heating mechanism can be a laser beam 30 emitted by a laser 32 and the heating can be facilitated by directing the laser beam 30 at the thermal desorption probe 14. In particular, the laser beam 30 can be directed at the thermally active tip 24 or the cantilever body 26, as shown in FIGS. 4 and 5, respectively.

Where the thermally active tip 24 contacts the specimen (S), the heating mechanism can include frictional force. For example, the cantilever body 26 can oscillate at a high frequency, e.g., an ultrasonic frequency, while the thermally active tip 24 contacts the specimen (S). The repeated contacting of the specimen (S) by the thermally active tip 24 can provide additional heating or can be used as an independent method of thermally desorbing the gaseous analyte 42 from the target site 36.

The thermal desorption probe 14 can also be designed to function as an atomic force microscopy probe. Thus, the mechanical properties of the thermal desorption probe 14 and its components, the thermally active tip 24 and the cantilever body 26, can be designed for use for measuring the topography of a surface as part of an atomic force microscope. The system 10 can include an atomic force microscopy system 38 for utilizing the thermal desorption probe 14 for measuring the topography of a surface 40 of the specimen S.

Figure 3:
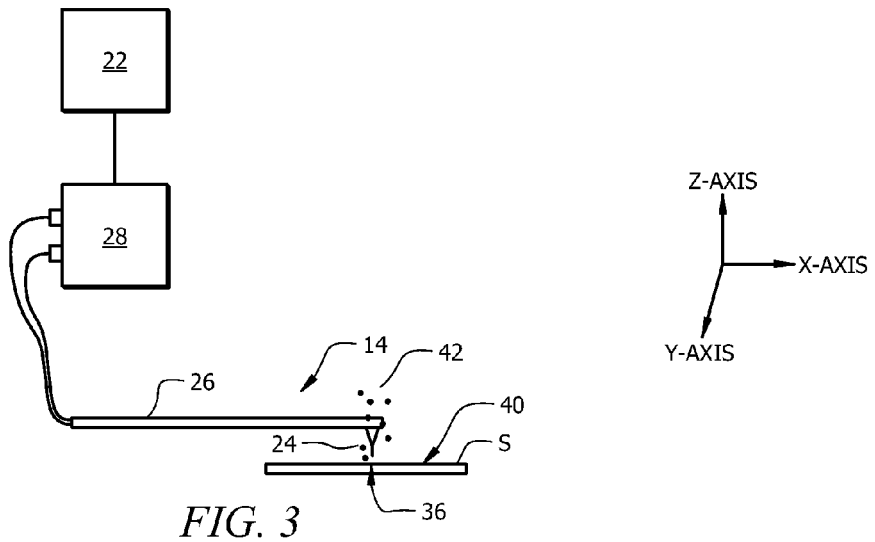
FIG. 3 is a schematic of a thermal desorption probe and a specimen in non-contact mode where the thermally active tip is resistance-heated.
Figure 4:
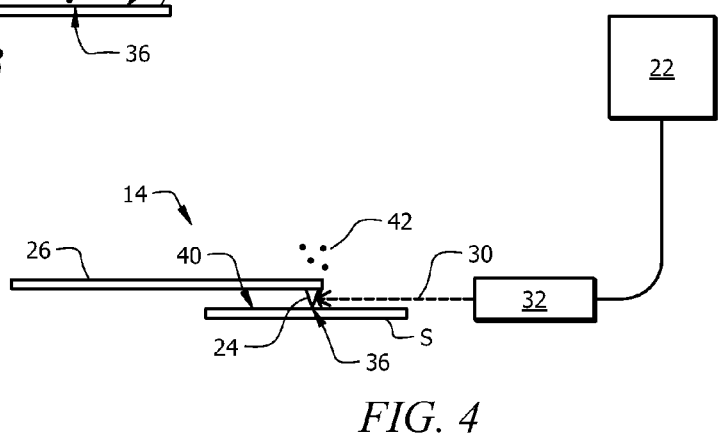
FIG. 4 is a schematic of a thermal desorption probe and a specimen in contact mode where the thermally active tip is laser-heated.
Figure 5:
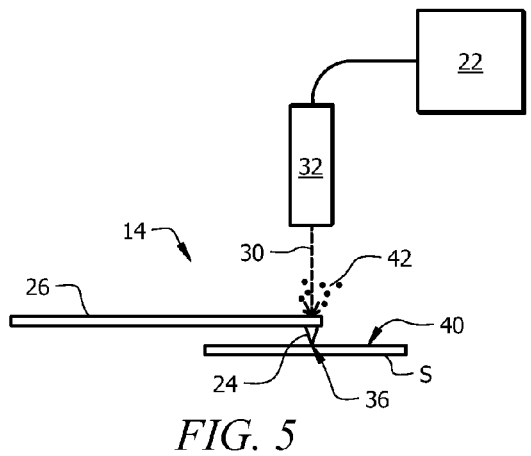
FIG. 5 is a schematic of a thermal desorption probe and a specimen in contact mode where the thermally active tip is laser-heated.

During the analysis process, the stepper mechanism 20 can move the heated thermally active tip 24 and the target site 36 such that they are proximate to or in contact with one another, as shown in FIGS. 3 and 4, respectively. This position can be maintained until a gaseous analyte 42 evolves from the target site 36. The gaseous analyte 42 can be volatized molecules from the target site 36, pyrolytic decomposition products of molecules from the target site 36, or both. Generally, desorption of smaller molecules can be achieved by volatilization, white larger molecules may require pyrolytic decomposition.

The collection device 16 of the system 10 can be arranged to capture a gaseous analyte 42 desorbed from the specimen (S) by the thermal desorption probe 14. Because of the nanoscale dimensions of the thermally active tip 24, the quantity of gaseous analyte 42 evolved from an individual target site 36 is miniscule, e.g., on the order of picomoles or even attomoles.

Figure 10:
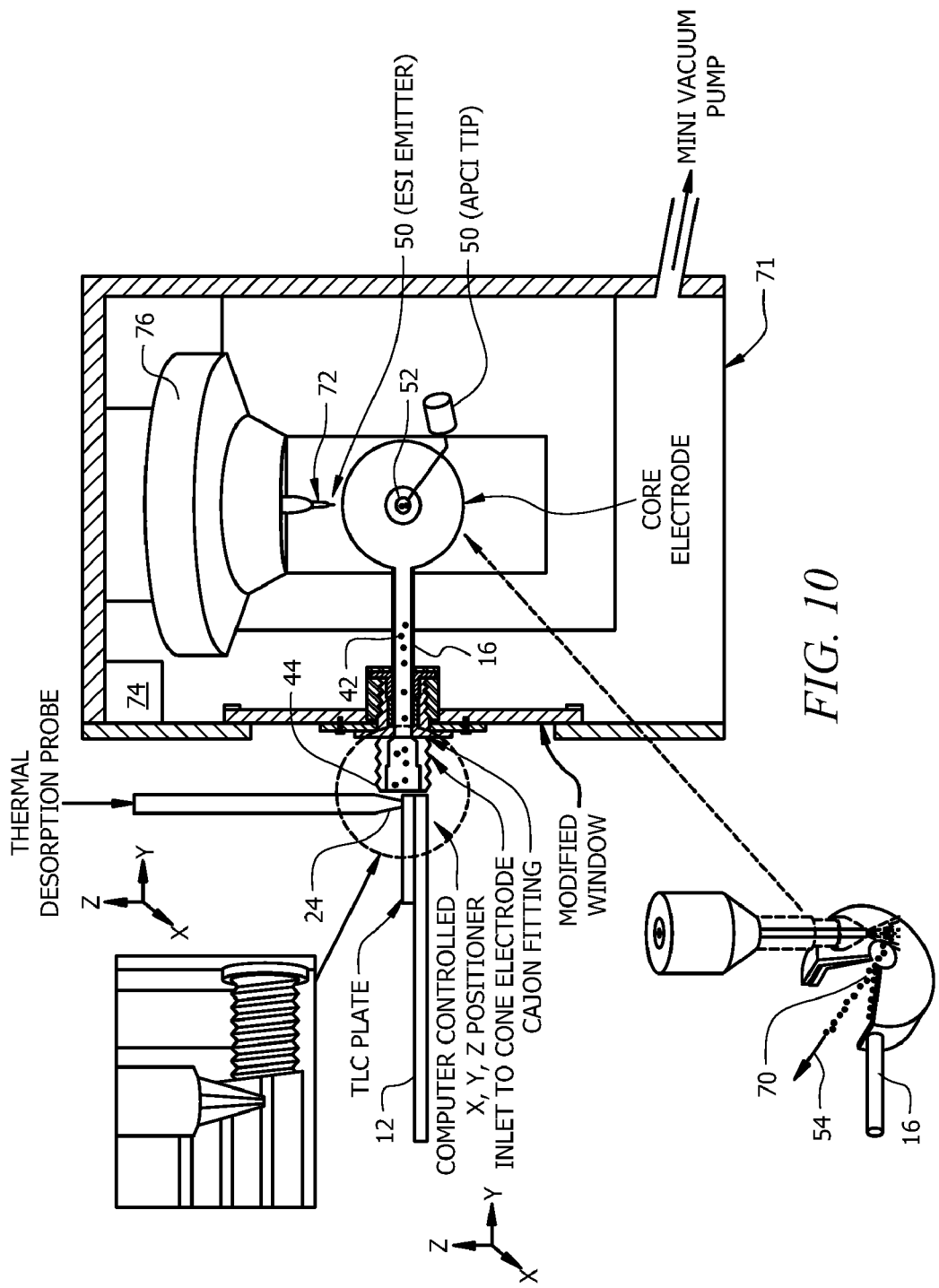
FIG. 10 is a schematic illustration of a thin-layer chromatography/thermal desorption/ionization-mass spectroscopy setup used in an example.

Several unique features of the system 10 that enable analysis of such miniscule quantities are of particular note. For example, the analysis generally takes place at atmospheric pressure, rather than in a vacuum as is generally preferred in the thermal desorption art. In addition, as shown in FIG. 10, the ionization source 50 and a portion of the collection device 14 are contained within a heated housing 71. The housing 71 can include one or more block heaters 74 for maintaining the interior of the housing 71 at or near the temperature of the thermally active tip 24 when the gaseous analyte 42 was evolved. In addition, the nebulizing gas tip 72 can be supplied with nebulizing gas that has been heated by a nebulizing gas heater 76. Thus, the nebulizing gas can exit the nebulizing gas tip 72 at a temperature at or near the temperature of the thermally active tip 24 when the gaseous analyte 42 was evolved. For example the block heater 74 and nebulizing gas heater 76 can heat the relevant gases to temperatures between 100 and 1000° C., or between 150 and 750° C., or between 200 and 500° C., or between 250 and 400° C., or at least 200° C., or at least 250° C., or at least 300° C., or at least 350° C. The combination of these features contributes to a highly efficient ionization process that enables the mass spectrometer to detect the miniscule quantities of analyte, e.g., attomole quantities, required for nanoscale resolution using thermal desorption techniques.

Thus, the methods described herein can include maintaining said gaseous analyte 42 at a relatively constant temperature as the gaseous analyte 42 is transported from an inlet 44 to an outlet 46 of the collection device 16. For example, a temperature of the gaseous analyte 42 can be at least 150° C., at least 200° C., at least 250° C., or at least 300° C., or at least 350° C. In particular, the temperature of the gaseous analyte 42 can be maintained high enough that the gaseous analyte 42 does not condense on an interior of the collection device 16.

Figure 1B:
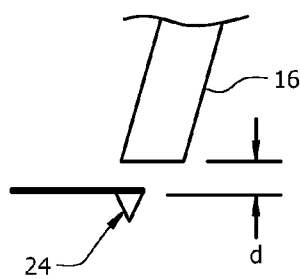
Figure 11A:
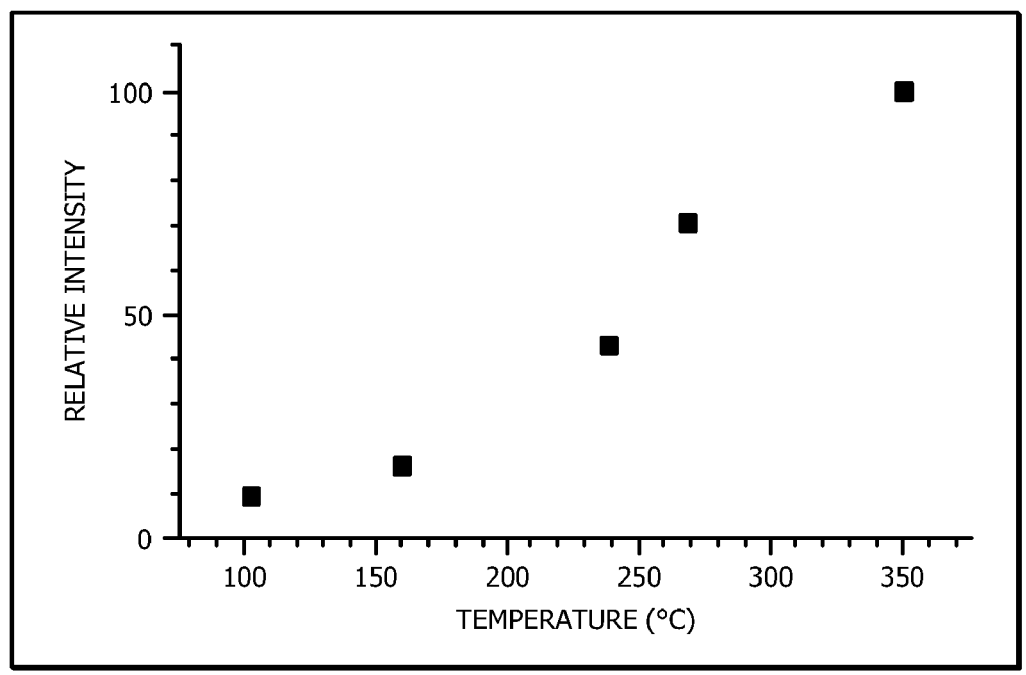
FIG. 11 is charts of normalized SRM intensity for TNT in APCI negative ion mode versus (a) proximal probe temperature, and (b) gas flow rate into the ion source of the mass spectrometer.
Figure 11B:
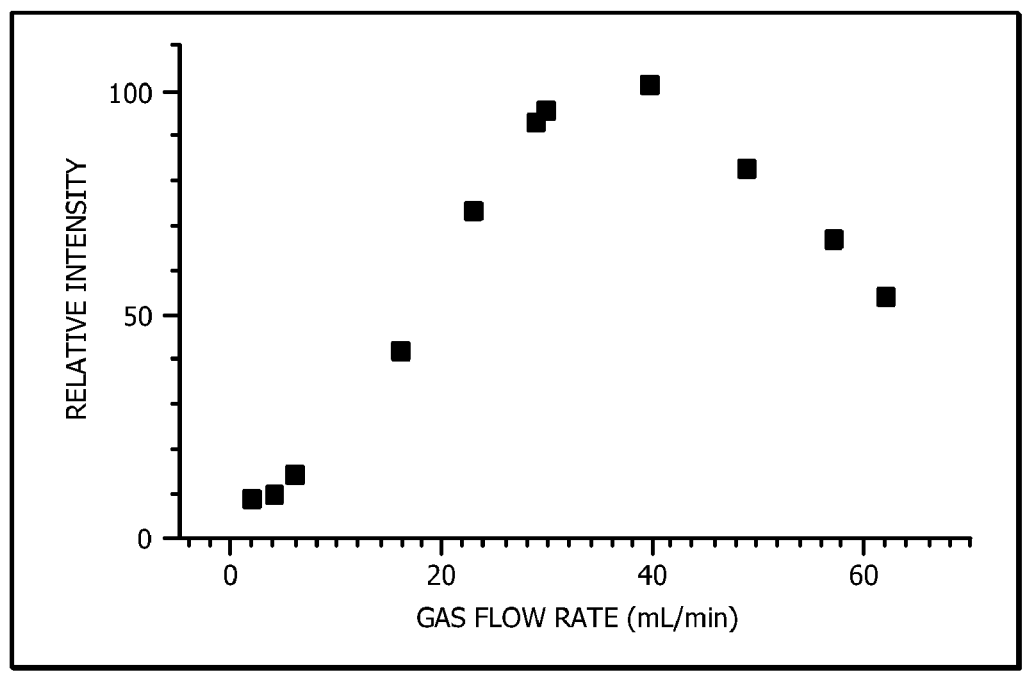

An inlet 44 of the collection device 16 can be positioned proximate the thermally active tip 24. For example, as shown in FIG. 1(b), a distance (d) between the inlet 44 of the collection device 16 and the thermally active tip 24 can be 500 μm or less, or 250 μm or less, or 100 μm or less, or 50 μm or less. In order to facilitate capture of the gaseous analyte 42, the collection device inlet 44 can be placed above the thermally active tip 24, as shown in FIG. 1. Alternately, the collection device inlet 44 can be placed to the side of the thermally active tip 24, as shown in FIG. 11.

An outlet 46 of the collection device 16 can coupled of an inlet 48 for an analytical instrument 18. An intake flow rate of the collection device 16 can be between 0.1 mL/min and 60 mL/min, or between 1 mL/min and 50 ml/min, or between 5 mL/min and 40 mL/min. The pressure at the sample surface can be approximately atmospheric pressure, e.g., 0.95-1.05 atm.

A gas outlet 46 of the collection device 16 can be coupled to a gas inlet 48 of an analytical instrument 18. For example, as shown in FIG. 1, the collection device 16 can be directly coupled to the gas inlet 48 of an ionization source 50 and indirectly coupled to the gas inlet 52 of a mass spectrometer 54. A gas outlet 56 of the ionization source 50 can be directly coupled to the gas inlet 52 of the mass spectrometer 54. As used herein, where an inlet and an outlet are coupled, they are physically coupled such that a gas exiting the outlet is directed into the inlet with little to no loss to the atmosphere.

The analytical instrument 18 can be any instrument utilized for analyzing gaseous analytes. Exemplary analytical instruments include, but are not limited to, mass spectrometers, ionization sources, separation methods, and combinations thereof. Exemplary ionization sources include, but are not limited to electrospray ionization, atmospheric pressure chemical ionization, atmospheric pressure photo-ionization or inductively coupled plasma. Exemplary separation methods include, but are not limited to, atmospheric pressure ion mobility or differential mobility spectrometery (post-ionization) and gas chromatography. Exemplary mass spectrometers ("MS") include, but are not limited to, sector MS, time-of-flight MS, quadrupole MSS filter MS, three-dimensional quadrupole ion trap MS, linear quadrupole inn trap MS. Fourier transform ion cyclotron resonance MS, orbitrap MS and toroidal ion trap MS. Exemplary ionization sources are electrospray ionization, atmospheric pressure chemical ionization, and combinations thereof, i.e., electrospray chemical ionization (ESCi).

As used herein, a stepper mechanism has its standard meaning in the art and should be understood to include any device or combination of devices for changing the relative position between the thermal desorption probe 14 and the sample stage 12 or the specimen (S) supported thereon. For example, the sample stage 12 can be coupled to the stepper mechanism 20 and move the sample stage 12 laterally (X-axis), transversely (Y-axis), and vertically (Z-axis) along the sampling path 60. Alternately, the thermal desorption probe 14 can be mounted to the stepper 20, e.g., via the atomic force microscopy system 38, and can move the thermal desorption probe 14 laterally, transversely and vertically along the sampling path 60.

Figure 2:
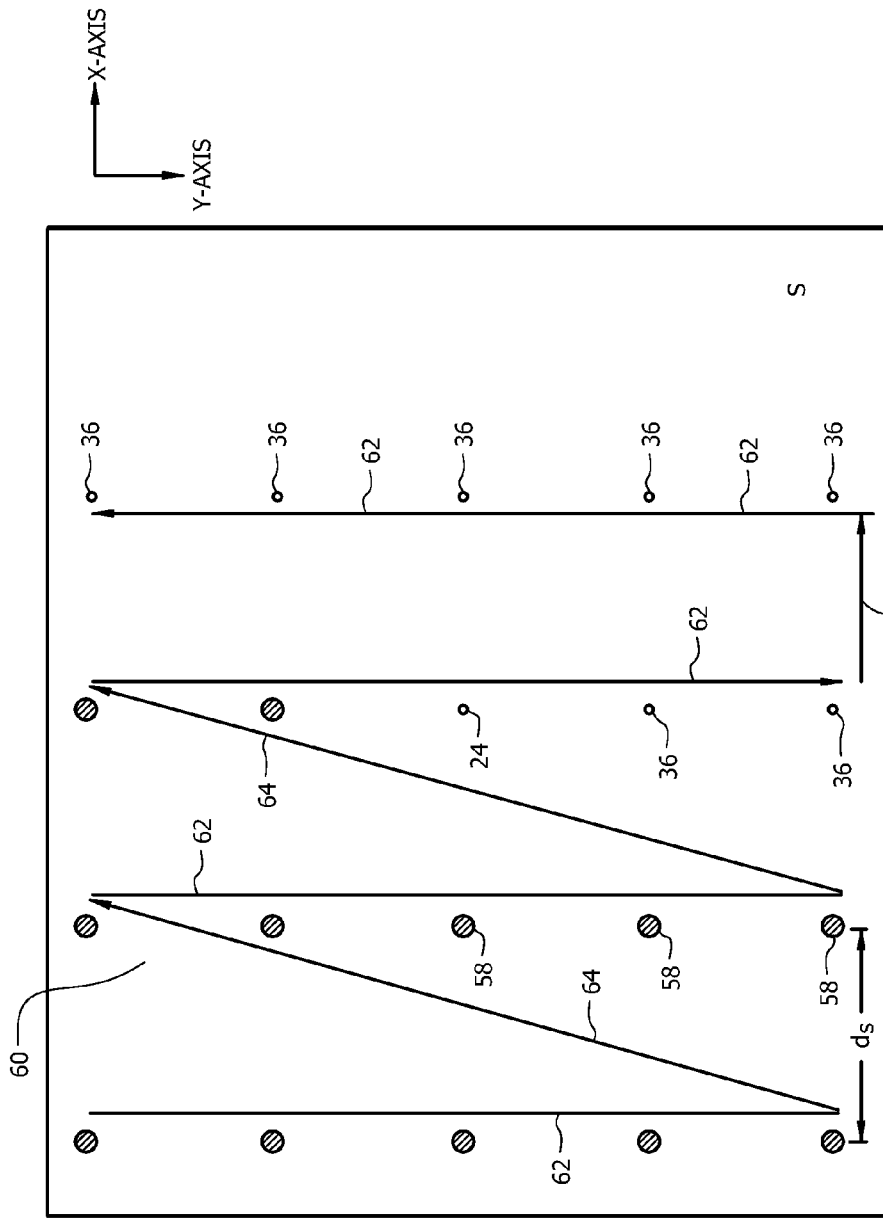
FIG. 2 is a cross-sectional view of the system according to FIG. 1(a) taken along cut line A-A.

As shown in FIG. 2, a sampling path 60 can be a sampling regime that includes a plurality of target sites 36. FIG. 2 only shows the lateral and transverse component of the sequence for sampling the target sites 36 along the sampling path 60; however, the sampling path 60 can also include a vertical component. For example, as shown in FIG. 10(a), the thermally active tip 24 and a first target site 36 will be brought into contact for purposes of thermally desorbing an analyte at the first target site 36, and can then be separated with the thermally active tip 24 is positioned above a second target site 36.

As shown in FIGS. 2 and 10(a), thermal desorption of a target site will produce a crater 58 from the desorbed molecules. The diameter of the craters can be 1 μm or less, or 500 nm or less, or 250 nm or less, or 125 nm or less, or 50 nm or less.

The thermal desorption can occur with the thermal desorption probe 14 in contact with the target site 36. The articulation between sequential target sites 36 can occur with the thermal desorption probe 14 in contact with the specimen (S) or proximate to, but not contacting, the specimen (S). Similarly, the thermal desorption can occur with the thermal desorption probe 14 proximate, but not contacting, the target site 36. The controller 22 can be configured for causing the stepper mechanism 20 to perform each of the thermal desorption sequences described above, or anywhere herein.

In some examples, the target sites 36 can be sampling lines 62. In general, the plurality of sampling lines 62 will be parallel and spaced apart by a distance ($d_s$). In such an embodiment, the specimen (S) can be thermally desorbed along an entire sampling line 62 and the gaseous analyte 42 analyzed continuously by the analytical instrument 18. The thermal desorption probe and the sample stage 12 will then travel along a relocating path 64 prior to thermally desorbing the next sampling line 62 along the sampling path 60.

The sampling path 60 can be an array of regularly spaced target sites 36. As used herein, "regular spacing" and "regularly spaced" are used interchangeably and refer to spacing where the distance between adjacent target sites 36 in a line is equal or approximately equal along the length of the line, as shown in FIG. 2. Regular spacing also refers to instances where the same target site is part of two or more lines with regular spacing, which is also shown in FIG. 2. Of interest, the center-to-center distance between adjacent target sites 36 can be 5 μm or less, or 3 μm or less, or 2 μm or less, or 1 μm or less, or 0.5 μm or less, or 250 nm or less, or 100 nm or less, or 50 nm or less.

In some instances, the entire sampling path 60 will be determined prior to beginning the sampling process, i.e., prior to the thermal desorption of the first target site 36. In such instances, the surface 40 of the specimen (S) can be scanned to determine the topography of the specimen (S) using the thermal desorption probe in atomic force microscopy mode. In such embodiments, the topography of the specimen (S) can be used to determine the lateral, transverse and vertical components of the sampling path 60 prior to thermal desorption of the first target site 36.

The data from each of the target sites 36 can be stored in a computer readable storage, such as are known in the art. The data can be complied to form a two-dimensional map, or surface, of the composition of the specimen by plotting the data according to the array of target sites was obtained. The data can be displayed on an output device, such as a monitor, printer, smartphone or the like.

The system 10 can also include a controller 22 configured for carrying out any of the method steps described herein. For example, the controller 22 can be configured for causing the stepper mechanism 20 to sequentially articulate the thermal desorption probe 14, the sample stage 12, or both, along a predetermined sampling path 60 comprising a plurality of target sites 36. The controller 22 can also be configured for heating the thermally active tip 14 to a temperature greater than 200° C. while proximate the target site 36 in order to cause analytes at the plurality of target sites 36 to form gaseous analytes 34, and cooling the thermally active tip 14 to approximately room temperature, e.g., less than 40° C., between thermal desorption processes.

The controller 22 can include a computer readable storage 66 in communication with a processor 68. The computer readable storage 66 can include computer executable instructions for carrying out the methods described herein. The processor 68 can be configured to execute the computer executable instructions stored on the computer readable storage 66. The controller 22 can be in communication with the stepper mechanism 20, the atomic force microscopy system 38, the analytical instrument 50, the laser 32, the voltage source 28, the block heater 74 and/or the nebulizing gas heater 76 described herein. In addition, although shown as a single box that includes a single computer readable storage 66 and a single processor 68, it should be understood that the controller 22 can be spread across multiple devices and can include multiple computer readable storages and processors.

As used herein, sequentially articulate refers to automatically moving the thermal desorption probe 14, the sample stage 12, or both along the sampling path 60 to a plurality of target sites 36. In some instances this articulation can be continuous while in others there will be intermittent pauses. For example, the articulation may be paused while the target sites 36 are thermally desorbed in order to ensure an adequate amount of gaseous analyte 42 is evolved from the target site 36, or articulation may be paused while the thermally active tip 24 is heated to an adequate temperature for thermal desorption, or to provide adequate separation between ionized analyte samples being fed to an analytical instrument 18, such as a mass spectrometer 54.

A method of analyzing a chemical composition of a specimen is also described. The method can include providing a specimen (S) for evaluation and a thermal desorption probe 14. The method can also include thermally desorbing an analyte from a target site 36 of the specimen (S) using a thermally active tip 24 of the thermal desorption probe 14 to form a gaseous analyte 42. The thermal desorption step can include heating the thermally active tip to above 200° C., and positioning the target site 36 and the thermally active tip 24 such that the heating step evolves the gaseous analyte 42. The method can also include ionizing the gaseous analyte 42 to form an ionized analyte 70 and analyzing a chemical composition of the ionized analyte 70.

The method can also include determining a predetermined sampling path 60 comprising a plurality of target sites 36 prior to the first thermal desorption step. Additionally, the method can include sequentially articulating the thermally active tip 24 and/or the sample stage 12 along the predetermined sampling path 60 and repeating the thermally desorbing, ionizing and analyzing steps for each target site 36. The sequentially articulating step can include moving the thermally active tip 24, the sample stage 12 or both, so that the thermally active tip 24 is sequentially positioned proximate each target site 36 along the sampling path 60 so that each target site can be thermally desorbed.

The step of determining the predetermined sampling path 60 can include analyzing the topography of the specimen utilizing the thermal desorption probe 14 in an atomic force microscopy mode. Analyzing can include mapping the position laterally and transversely and, optionally, vertically of the target sites 36 and the sampling path 60.

The method can also include plotting any exogenous or endogenous property related to the specimen (S) being evaluated, including a property of a molecule or chemical component for each of the target sits 36. Properties of interest include, but are not limited to, concentration of a molecule or decomposition product, the relative ratio of two molecules (such as compound and reaction product of the compound), and the relative ratio of decomposition products.

For example, the property of can be the concentration of a chemical component, such as a pharmaceutical and its metabolites, at each target site 36. By arranging the data for each target site spatially within the specimen (S) a two dimensional surface can be plotted.

In some exemplary methods, the thermal desorption step can include volatizing on analyte at the target site 36, pyrolyzing an analyte at the target site 36, or a combination of both. The ionizing step can include passing the gaseous analyte 42 through an ionization source 50 and, independently, the analyzing step can include evaluating the ionized analyte 70 with a mass spectrometer 54.

EXAMPLES

The example and calculations provided herein are provided to demonstrate the ability to achieve nanometer, i.e., submicron, spatial resolution for chemical composition analysis using thermal desorption techniques. Although the examples described herein are specific, the potential applications of the coupled AFM/mass spectrometer system extend far beyond these specific examples. For example, in the study of polymeric materials for identification of impurities, or to determine trace amounts of materials locally isolated to submicron regions in tissues, which can be useful in the development in pharmaceutical drugs.

Example 1

Electrospray ionization (ESL) works by ionizing a gaseous sample through reaction with charged solvent droplets, protonated solvent species, or gas phase ions created in the ESI process. Besides the apparent high secondary ionization efficiency, the other advantage of using ESI is the ability to form multiply-charged species from macromolecular species.

In atmospheric pressure chemical ionization (APCI) ionization occurs by ion/molecule chemistry in a plasma that is created by a corona-discharge at the end of a metal needle. APCI is limited to forming singly-charged ions. The ionized molecules formed with either source will then be analyzed by either a quadrupole ion trap or a triple quadrupole mass spectrometer. The experimental set-up using ESI source and a Waters TQD triple quadrupole mass spectrometer is shown schematically in FIG. 6.

In order to create chemical images, software was developed to allow for point sampling as well as continuous line scanning. Point sampling allows for maximum extraction of a sample from a given micrometer sized area as well as allow for the sampling of material at any point on a surface. Sequential line scanning can be used to create chemical distribution images from a sample surface.

in order to understand the true quantity of the analytes being tested to achieve nanometer scale resolution calculations were performed. As will be understood, the longer the desorption probe heats a certain region of a surface the larger the resulting desorption crater. The heat transfer between the two bodies can be modeled using Eq. 1 to estimate the diameter of craters that will be created from different sized heating probes as a function of time. The equation for heat transfer has the following form, $$\frac{dQ}{dt} = \frac{\kappa A(T_{hot} - T_{cold})}{d}$$ Eqn. 1 where dQ is the heat transferred, dt is the change in time, κ is the thermal conductivity constant of the barrier, A is the area, T is the temperature, and d is the thickness of the barrier.

Figure 7:
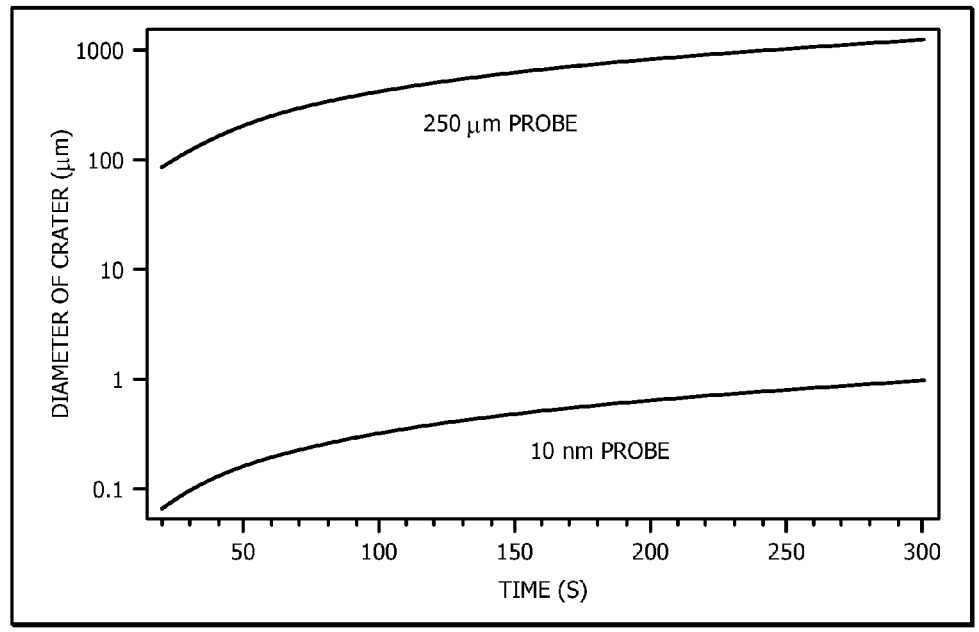
FIG. 7 is a graph showing the calculated diameter of a desorbed crater as a function of time for a 250 µm diameter probe tip and a 10 nm diameter probe tip.

FIG. 7 is a plot of crater size versus time, which demonstrates that there is a linear dependence between the size of a desorption crater and the time spent heating the surface. In addition, the diameter of the desorption crater is strongly dependent on the size of the heating probe. Therefore, it is necessary to estimate the minimal size of a desorption crater that will generate enough molecules to be detectable.

The number of molecules desorbed from a given desorption crater using equation 2, $$Moles = C * V * \left(\frac{A_2}{A_1}\right)$$ Eqn. 2 where C is the concentration of a given sample, V is the total amount of material, $A_1$ is the total area of sample, and is the desorbed area of the sample.

Figure 8:
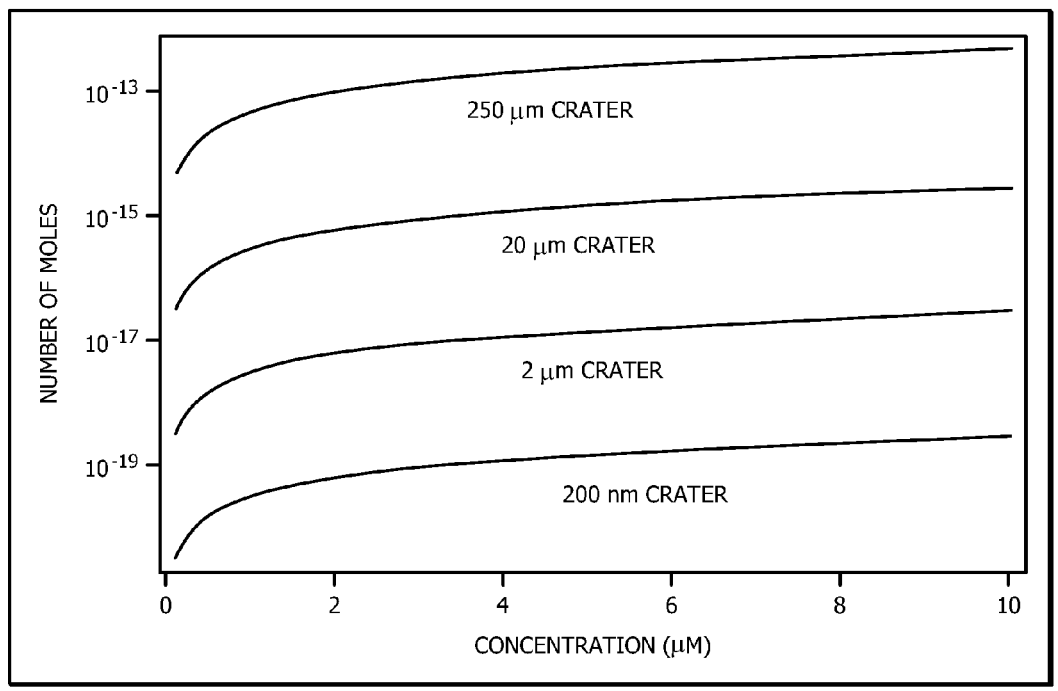
FIG. 8 is a graph showing the calculated number of moles desorbed by a variety of different diameter thermal probe tips versus concentration for varying crater diameters.

FIG. 8 is a graph of the number of moles desorbed from a crater versus the concentration of the molecules on the surface for several crater diameters generated using Equation 2. The curves were calculated using a constant sample area ($A_1$=1 cm$^2$) with $A_2$ was set to the size of crater formed by the heated probe. These results demonstrate that fmol amounts of molecules will desorbed from a 250 micrometer sized crater. Smaller craters (200 nm-2 μm) reduce these amounts into the attomol range.

Example 2

Figure 6:
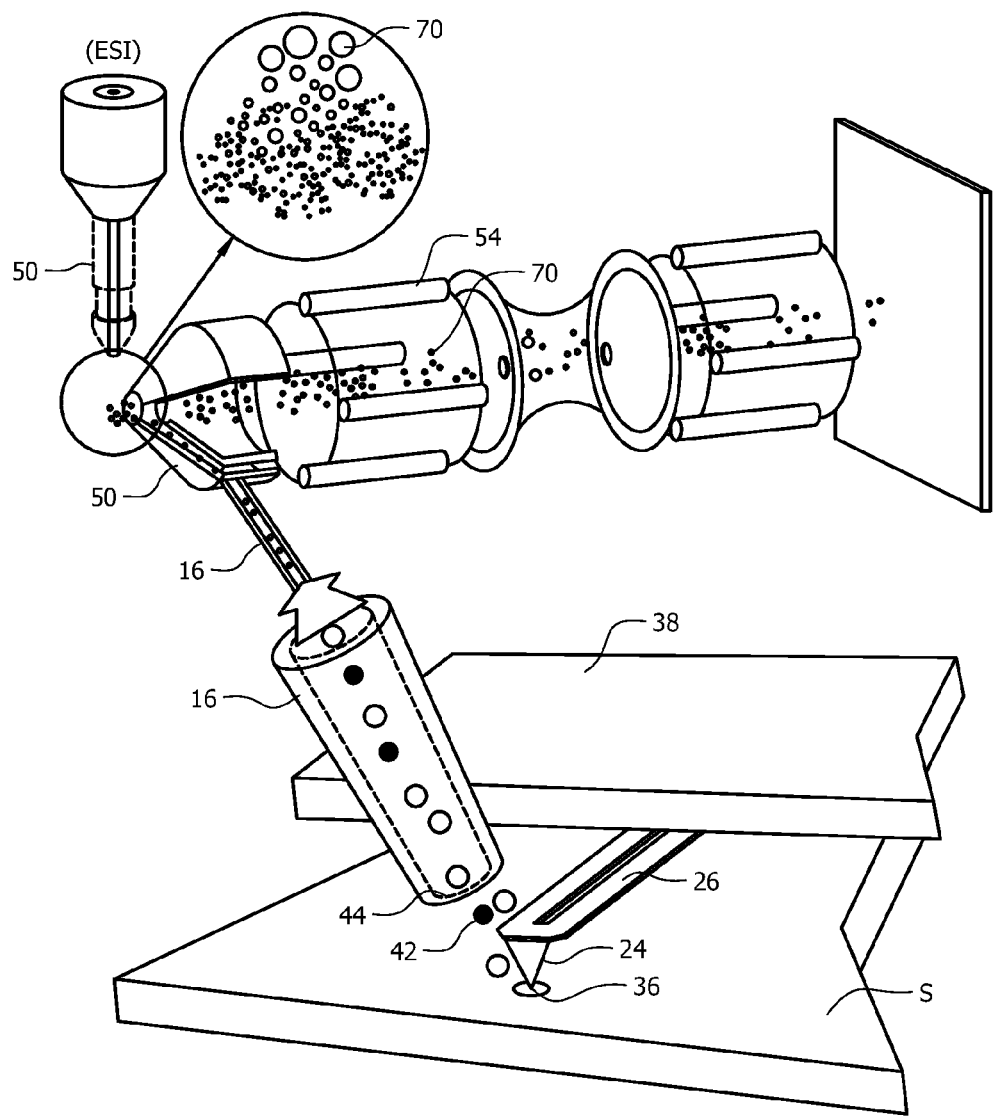
FIG. 6 is a schematic of a system according to the invention.

FIG. 6 shows an experimental set-up for the thermal desorption process described herein. Once the material is desorbed by the thermally active tip 24 the gaseous analyte 42 will be transferred from the desorption area 36 around the heated probe to the ionization source 50 using a pump that creates a flow of gas from the collection device inlet 44 probe into the ionization source 50. The gaseous analyte 42 will then be ionized by the ionization source (ESI or ANA) best suited for the targeted small molecule being investigated.

Figure 9A:
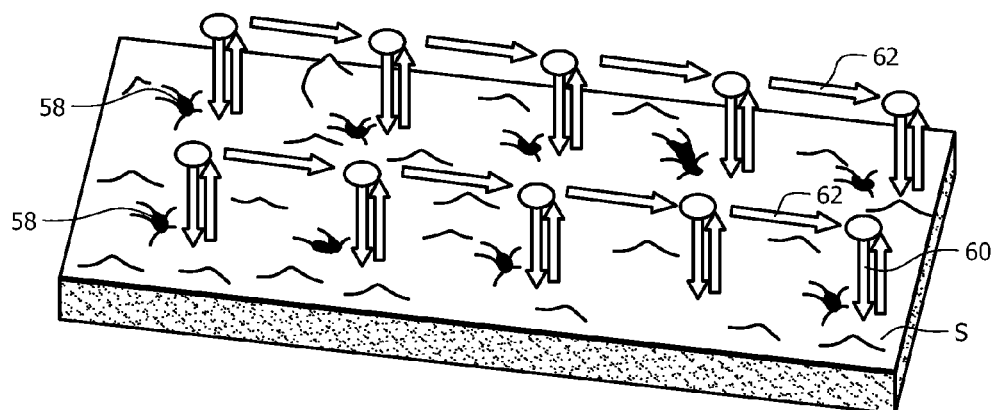
FIG. 9(a) is an AFM image of a surface that has been sampled by a thermal desorption probe system as described herein.

FIG. 9(a) shows an AFM image of a specimen (S) with a caffeine coating that was analyzed using the thermal desorption technique described herein. The sampling was conducted by positioning the thermally active tip a distance of 10 μm above the individual target site and heating the thermally active tip to 350° C. The tip was then slowly lowered into contact with the target site and maintained at the surface for 30 seconds at which point the tip was cooled and removed from the surface. The tip was them articulated so that it was positioned 10 μm above the next target and the process was repeated. In all there was a 20 second delay between when one thermal desorption cycle ended at one target site and the next began at the adjacent target site. The image of the specimen clearly shows the craters 58 formed at the target sites by the thermal desorption technique.

Figure 9B:
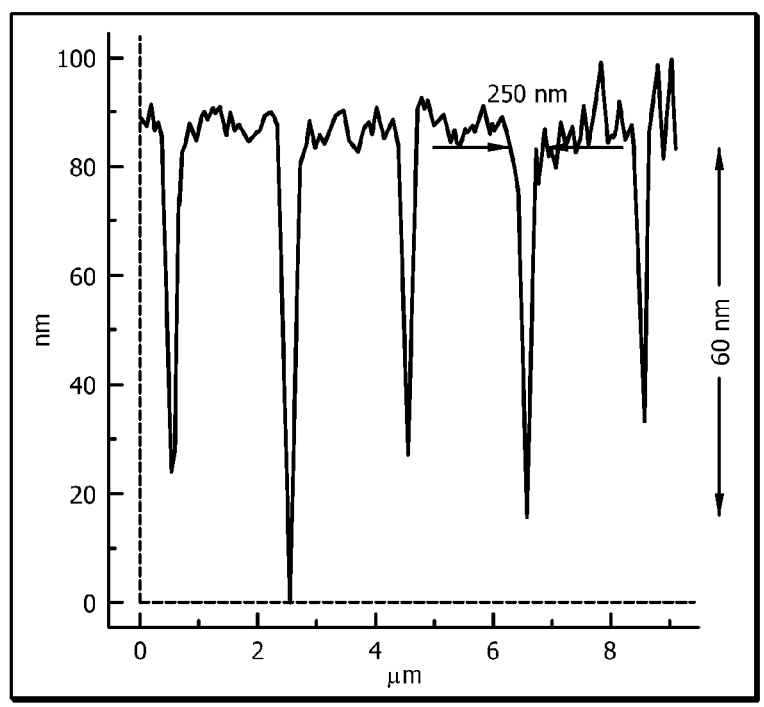
FIG. 9(b) is a graph showing the depth of the craters shown in FIG. 9(a)

FIG. 9(b) shows a plot of the topography of the surface of the specimen shown in FIG. 9(a) taken along one of the sampling lines. The plot shows that the craters are approximately 250 nm wide and approximately 60-80 nm deep.

Figure 9C:
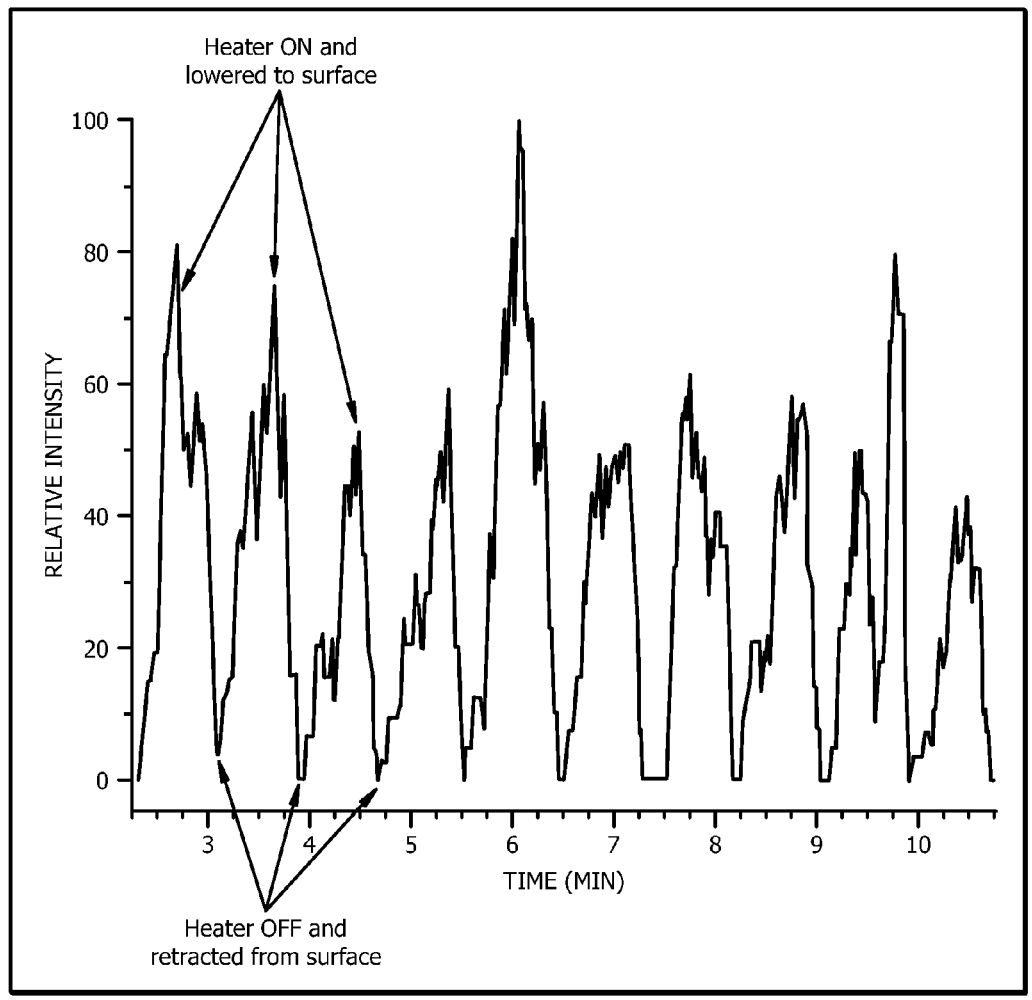
FIG. 9(c) is a chronogram showing the relative intensity of the SRM caffeine (m/z 195→138) versus time.

FIG. 9(c) shows the mass spectrometry results from the thermal desorption process described with respect to FIG. 9(a). The results are a relative intensity chronogram for SRM of caffeine (m/z 195→138). Based on the calculations set forth above, it is estimated that each thermal desorption evolved 6 attomol or 1.2 fg of caffeine. This example demonstrates the ability to obtain sub-micron resolution chemical composition data.

Example 3

This Example focuses on an analysis where the specimen is a high-performance thin-liquid chromatography (HPTLC) plate.

Analyte Chemicals

HPLC grade acetonitrile was purchased from Burdick and Jackson (Muskegon, Mich., USA). HPLC grade methanol, ACS grade chloroform, toluene and methylene chloride were obtained from J. T. Baker, Inc, (Phillipsburg, N.J., USA). ACS grade acetone and ethyl acetate were acquired from EM Sciences (Gibbstown, N.J., USA). Glacial acetic acid, 99% ethanol, Sudan red 7B (CAS No, 6368-72-5), 2-acetoxybenzoic acid (aspirin, CAS No, 50-78-2) and N-(4-hydroxyphenyl) ethanamide (acetaminophen or paracetamol, CAS No. 103-90-2) were purchased from Sigma Aldrich (Milwaukee, Wis., USA), A test Dye Mixture V containing Sudan red 713, solvent green 3 (CAS No. 128-20-3), and solvent blue 35 (CAS No. 17354-14-2) in toluene was obtained from Analtech, Inc, (P/N 30-05, Newark, Del., USA). Standard solutions (1000 mg/mL in acetonitrile) of 1,3,5,7-tetranitro-1,3,5,7-tetrazocane (UNIX, CAS No. 2691-41-0), 1,3,5-trinitroperhydro-1, 3,5-triazine (RDX, CAS No. 121-82-4) and 2,4,6-trinitrotoluene (TNT, CAS No. 1.21-14-2) were obtained from Supelco (Bellefonte, Pa., USA). Stock solutions (1000 mg/mL) of 1,3,5-triazine-2,4,6-triamine (melamine, CAS No. 108-78-1) in diethylamine/water (80:20, v/v) were purchased from Restek (Restek Corp., Bellefonte, Pa., USA), 2,4-Dichlorophenoxyacetic acid (2,4-D, CAS No. 94-75-7), 4-(2,4-dichlorophenoxy) butyric acid (4-(2,4-DB), CAS No. 94-82-6) and 2,4,5-trichlorophenoxyacetic acid (2,4,5-T, CAS No, 93-76-5) were obtained from PolySciences Corp. (Niles, IL, USA). 1,3,7-Trimethyl-1H-purine-2,6(3H,7H)-dione (caffeine, CAS No. 58-08-2) was purchased from J. T. Baker. Extra Strength Excedrin (Bristol-Meyers Squibb, New York, N.Y., USA) containing 250 mg aspirin, 250 mg acetaminophen, and 65 mg caffeine per tablet was purchased over the counter locally.

A solution of Sudan red 7B was prepared in methanol (2.4 mM) for TLC and ESI/APCI-MS detection optimization. Standard solutions from 0.01-10000 mg/mL of this dyestuff for TLC were prepared by serial dilution of a methanolic stock solution with methanol. Solutions of HMX, RDX, and TNT for EST/APCI-MS detection optimization (4.4 mM) were prepared by dilution of 1000 mg/mL stock solutions in acetonitrile. The analytical standards for TLC were prepared by diluting this standard stock solution in acetonitrile. Solutions of acetaminophen (1 mM), aspirin (1 mM), caffeine (1 mM), 4-(2,4-DB) (1.5 mM), 2,4-D (1.2 mM), and 2,4,5-T (1.5 mM) were prepared for ESI/APCI-MS detection optimization by dissolving the compounds in methanol.

In all cases, application of sample solutions to the TLC plates was performed manually using a 10 mL syringe. Vertical development of all the plates was carried out in a covered flat-bottomed chamber.

The components, Sudan red 7B, solvent green 3, and solvent blue 35, of Test Dye Mixture V (about 1000 μg/mL of each dyestuff), were separated on glass-backed normal phase silica gel plates with organic binder and UV 254 indicator (HPTLC-HLF, 150 μm phase, P/N 59077, AnalTech Inc., Newark, Del., USA). The dye mix was spotted as a band (a closely spaced series of 1 μL aliquots) and the plate was developed in toluene. The developed plates were dried in an oven at 110° C. for 5 min just prior to analysis. Photographs of the developed plates prior to analysis were taken with an Olympus SP-500UZ digital camera (Olympus Imaging Corp., Tokyo, Japan) using white light illumination. Serial dilutions of Sudan red 713 (0.01-10 000 μg/mL) in methanol were prepared and 1 μL aliquots with 5 mm spacing were applied to the same type of HPTLC plate. The plates were developed in toluene and then dried in an oven (110° C.) for 5 min prior to analysis.

The explosives TNT, RDX and HMX were separated on glass-backed normal-phase HPTLC plates (ProteoChrom HPTLC silica gel 60 F254, 150-200 μm phase, P/N 1.05650.001, Merck KGaA, Darmstadt, Germany) using a procedure adapted from Douse. The explosives mix (1000 μg/mL of each explosive) was spotted as a band (a closely spaced series of 1 μL aliquots). Serial dilutions of TNT (0.001-1.000 μg/mL) were prepared in acetonitrile and 1 μL aliquots with 5 mm spacing were applied to the same type of HPTLC plate. A 1000 μg/mL solution of TNT was prepared in acetonitrile and 1 μL aliquots with 5 mm spacing were applied to the ProteoChrom HPTLC silica gel 60 plates, glass-backed RP-18 HPTLC plates (HPTLC gel 60 RP-18 F254s, 150-200 μm phase, P/N 13724/5, Merck KGaA, Darmstadt, Germany) and plain glass slides (Gold Seal Products, Portsmouth, N.H., USA). The HPTLC plates were developed in (v/v) chloroform/acetone and dried in an oven (110° C.) for 5 min prior to analysis. Photographs of the developed plates prior to analysis were taken with an Olympus SP-500UZ digital camera using short-wavelength UV illumination.

The TLC separation of herbicides, 4-(2,4-DB), 2,4-D, and 2,4,5-T, was performed using glassbacked normal-phase silica gel plates with organic binder and UV-254 indicator (HPTLC-HLF, 150 μm phase, P/N 59077, AnalTech Inc.). The herbicide mix (10000 mg/mL of each herbicide) was spotted as a band (a closely spaced series of 1 μL aliquots) and the plate developed in 85:15 (v/v) toluene/glacial acetic acid. The developed plates were dried in an oven (110° C.) for 5 min prior to analysis. Photographs of the developed plates prior to analysis were taken with an Olympus SP-500UZ digital camera using short-wavelength UV illumination.

The separation of aspirin, acetaminophen, and caffeine extracted from Excedrin tablets was carried out using a procedure adapted from Williamson on glass-backed normal-phase silica gel plates with organic binder and UV 254 indicator (HPTLC-HLF, 150 μm phase, P/N 59077, AnalTech Inc.). The pharmaceutical components were extracted from a ground-up fraction of an Excedrin tablet using 50:50 (v/v) ethanol/ethyl acetate (1.4 mg of tablet/mL of solution). The extract was centrifuged and filtered. The plates were pre-developed with 99:1 (v/v) ethyl acetate/glacial acetic acid and then dried in an oven at 110° C. for 30 min. The filtered solution containing aspirin, acetaminophen, and caffeine was spotted as a band (a closely spaced series of 1 μL aliquots) and the plate was developed in 99:1 (v/v) ethyl acetate/glacial acetic acid. The developed plates were dried in an oven (110° C.) for 5 min. Serial dilutions of acetaminophen (0.001-1000 μg/mL) were prepared in methanol and 1 μL aliquots with 5 mm spacing were applied to the same type of HPTLC plate. The plates were developed in 99:1 (v/v) ethyl acetate/glacial acetic acid and then dried in an oven (110° C.) for 5 mM prior to analysis. Photographs of the developed plates prior to analysis were taken with an Olympus SP-500UZ digital camera using short-wavelength UV illumination.

Aliquots (1 μL) of a 1000 μg/mL solution of melamine in diethylamine/water (20:80) (v/v) were applied with 5 mm spacing to glass-backed normal-phase HPTLC plates (ProteoChrom HPTLC silica gel 60 F254), glass backed RP-18 HPTLC plates (HPTLC silica gel 60 RP-18 F254s, 150-200 μm phase, P/N 13724/5, Merck KGaA), and plain glass slides (Gold Seal Products). Both types of plates were developed in 6:2:2 (v/v/v) acetonitrile/water/ethyl acetate and then dried in an oven (110° C.) for 5 min prior to analysis.

TLC/Proximal Probe TD-MS System

FIG. 10 shows a schematic and a photograph of the TLC/TD/I-MS experimental setup. The mass spectrometer used was a Waters TQD triple quadrupole with ESCi capability (Waters Corp., Milford, Mass., USA). Analyte detection was performed using full scan mode, single ion monitoring (SIM), or selected reaction monitoring (SRM) with Ar as a collision gas (0.20 mL/min). The SRM transitions monitored were: TNT (m/z 227→m/z 210, CE=10 eV), Sudan red 7B (m/z 380→m/z 183, CE=16 eV), solvent blue 35 (m/z 351→m/z 251, CE=30 eV), solvent green 3 (m/z 419→m/z 327, CE=33 eV), acetaminophen (m/z 152→m/z 110, CE=16 eV) and melamine (m/z 127→m/z 85, CE=19 eV).

A special cone electrode in the TQD ionization source can was fabricated by removing the normal curved gas inlet connection and attaching a straight 1.5" long stainless steel tube (⅛" o.d., 1/16" i.d.). This tube was connected to a modified Cajon connector secured into the window of the ion source can. The normal glass window in the door into the source can was replaced with plexiglass. An opening for the Cajon connector was constructed from two plexiglass pieces secured to one another with an O-ring and six screws. Either a 12 V, 1.5 amp KNF N815KTE mini vacuum pump (KNF Neuberger Inc., Freiburg, Germany), powered with a variable DC supply, or a model MZ 2D vacuum pump (Vacuubrand GMBH þ Co, Werhteim, Germany) with a F200S bleed valve (Parker Inc., Elyria, Ohio, USA) was put in the ion source exhaust line. Pumping on the source exhaust pulled air from the sampling region external to the source block through the modified source can window and modified cone electrode and into the ionization source. A model GPM 37 gas flow meter (Aalborg Instruments, Orangeburg, N.Y., USA) was connected to this gas inlet to calibrate gas flow rate into the source through the cone connection.

An MD 80 wand from a WD 1 soldering station (Weller, Germany) was used as the heated proximal probe. The exchangeable heated probe tip used had a width of 1.6 mm and a thickness of 0.7 mm. A digital controller was used to adjust the temperature at the probe tip from about 25 to 350° C. The heated probe used was mounted directly in front of the intake orifice into the ionization region though the modified source can window and gas cone electrode. The TLC plate was mounted so that the edge of the plate was as close as possible to the sampling inlet used to draw gas and vapors into the cone electrode region of the ionization source block. The glass-backed TLC plates were cut along the length of or perpendicular to the development lanes using a SmartCut device (CAMAG, Wilmington, N.C., USA) to enable close positioning of the heated probe and bands on the plate to the inlet region into the ionization source. The plates were affixed to a platform on top of the stage using double-sided tape.

The MS2000 x-y-z robotic platform (Applied Scientific Instrumentation Inc., Eugene, Oreg., USA), and control software used to manipulate the sample stage supporting the TLC plate relative to the stationary heated probe. The stage could be moved in all directions by manual or computer control to allow for scanning of the developed TLC lanes. The initial positioning of the stage and the sample to be investigated was done manually. The development lane along the TLC plate was scanned in the x-y plane under computer control. The exact position of the heated probe relative to the surface during an experiment was monitored using a CCD camera and a monitor.

Results

The schematic in FIG. 10 shows a setup for the following TLC/TD/I-MS experiments. This TD/I system used a heated metal probe placed close enough to just touch the surface of interest, but yet not physically disrupt the surface during a scan of the surface versus the stationary probe. Components desorbed from the surface were drawn into the ionization region of the existing ESI/APCI source, through the cone electrode, where they merged with reagent ions and/or charged droplets from a corona discharge or an electrospray emitter and were ionized. The ionized components were then drawn through the atmospheric sampling orifice into the vacuum region of the mass spectrometer and analyzed (FIG. 10).

Determining the position of the heated probe relative to the inlet of the mass spectrometer was important for optimum performance of the TLC/TD/I-MS system. This was accomplished by mounting the probe on an x-y-z translation stage and adjusting the vertical and horizontal position of the probe relative to the inlet into the cone electrode while monitoring the signal intensity of the analyte with the mass spectrometer. The region of the surface to be analyzed was positioned as near to the sampling tube as possible, within the constraints of the current instrument interface design, and at the vertical mid-point of the inlet tube. For the analysis of the TLC plates, this required the development lanes to be near the edge of the plate. Therefore, the developed plates were scored and cut parallel or perpendicular to the development direction to provide access to the bands of interest for analysis. Or course, alternate probe/inlet arrangements that might include an extension on the inlet tube can be implemented to allow analysis of uncut plates.

Beyond positioning of the heated probe and sample, the performance of the TLC/TD/I-MS system was also dependent the temperature of the heated probe, gas flow rate into the ionization region, and surface scan speed relative to the stationary heated probe. Optimal settings for the temperature of the heated probe were investigated using the relatively volatile TNT. TNT was applied to HPTLC plates as 1 μg spots (1 μL of a 1 mg/min standard) with 5 mm spacing between the spots and then the plate was developed. The TLC plate was scanned relative to the stationary heated probe at a rate of 200 μm/s while monitoring the signal for the SRM transition of TNT. Multiple experiments were performed using probe temperatures ranging from 100 to 350° C. and a gas flow rate into the ion source region of 30 mL/min (FIG. 11(a)). A probe temperature of 350° C., the highest temperature possible with the current apparatus, produced the maximum signal levels and was used for all subsequent studies. However, an even higher probe temperature might further improve the signal levels for this or other analytes, especially those less volatile than TNT. However, thermal degradation of the surface or the compounds of interest may become a factor at even higher temperatures.

Using this same TNT HPTLC separation, surface scanning, and mass spectrometry detection protocol, the effect of gas flow rate into the on source region on signal intensity was also investigated. By varying the voltage applied to the KNF pump on the ion source block, the gas flow rate into this region was varied from 5.5 mL/min up to 30 mL/min. The gas flow rate from 40 mL/min up to 62 mL/min was achieved using the Vacuubrand pump, by varying a Parker bleed valve (FIG. 11(b)). The maximum signal levels were achieved in the flow rate range of 30-40 mL/min. Note that this flow rate was well within the recommended cone gas flow setting for the mass spectrometer (viz. 0-833 mL/min). For simplicity of operation; the KNF pump providing a flow rate of 30 mL/min into the source region was used for all subsequent studies.

Figure 12A:
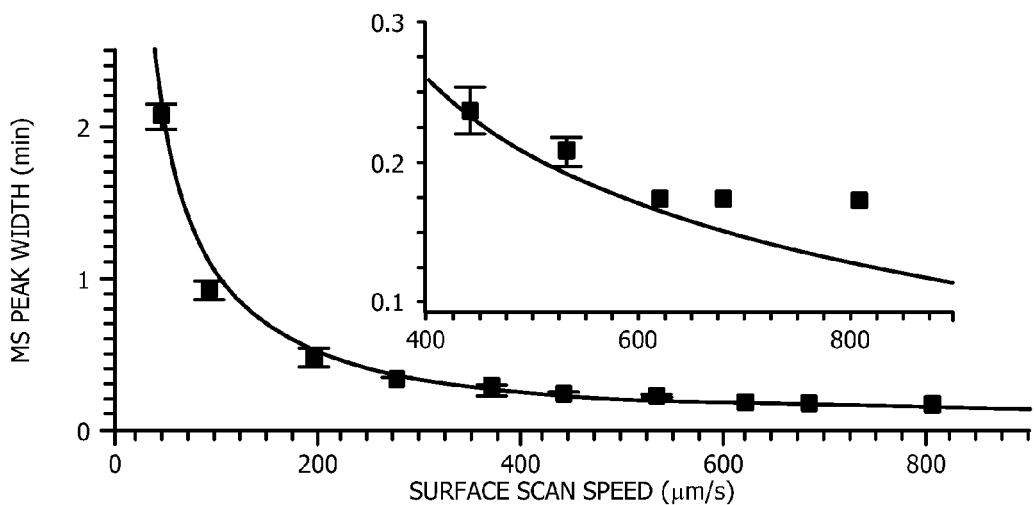
FIG. 12 is charts of (a) measured and calculated mass spectral peak widths, (b) normalized measured peak area, and (c) normalized peak height versus surface scan speed for Sudan red 7B using SRM detection in positive ion mode APCI.
Figure 12B:
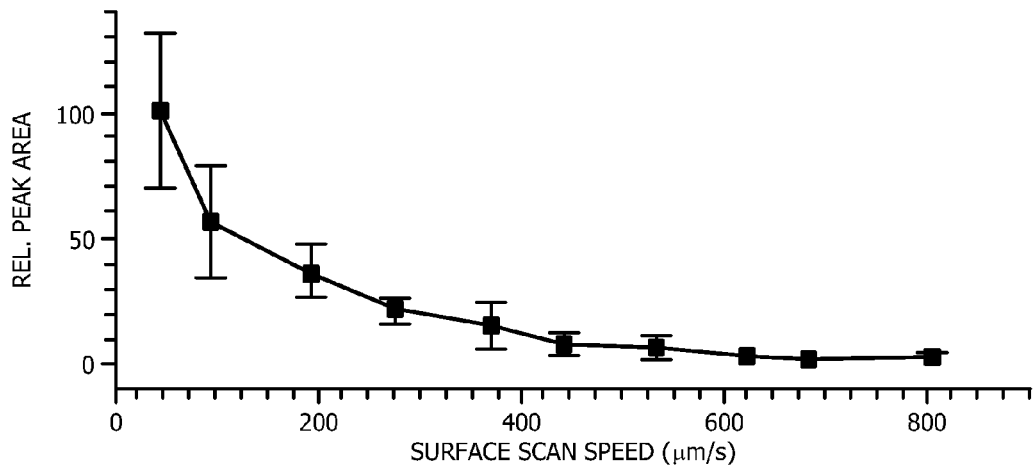
Figure 12C:
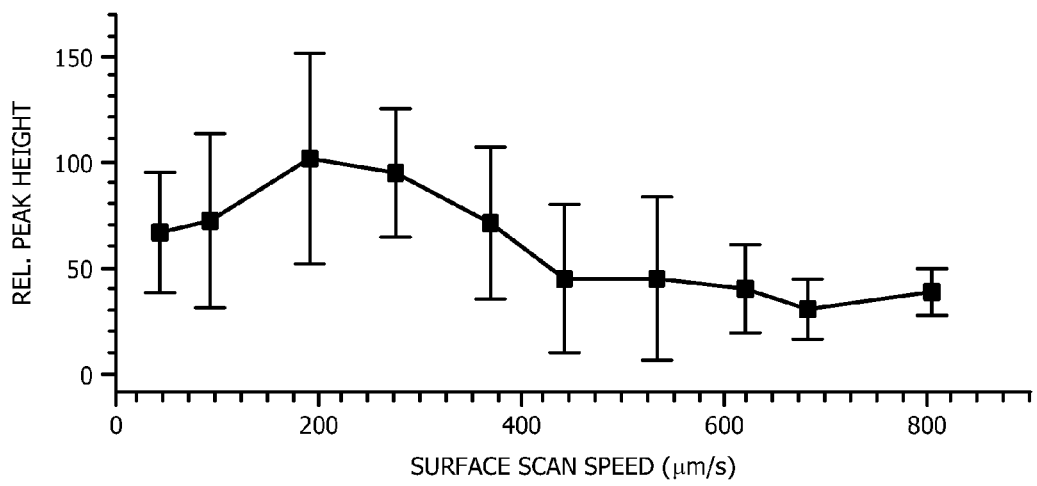
Figure 13A:
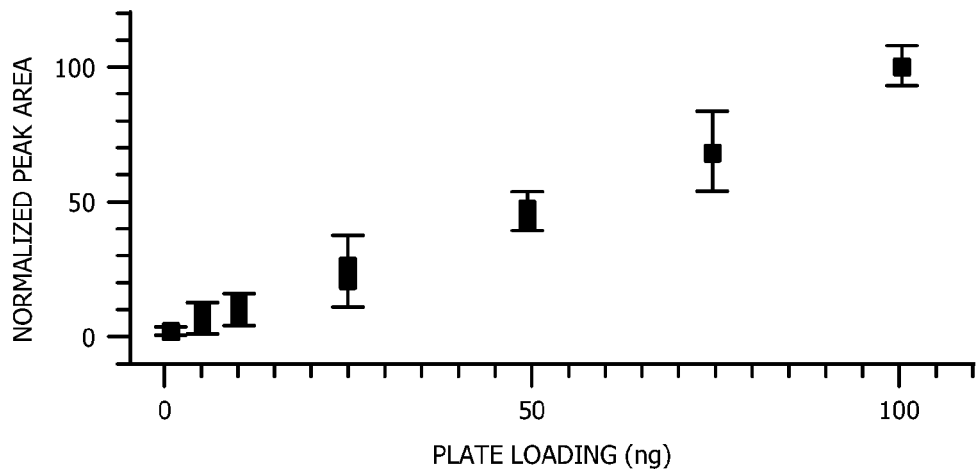
FIG. 13 is charts of normalized SRM peak areas versus amount spotted on the HPTLC plate for (a) TNT in APCI negative ion mode, (b) acetaminophen in APCI positive ion mode, and (c) Sudan red 7B in APCI positive ion mode.
Figure 13B:
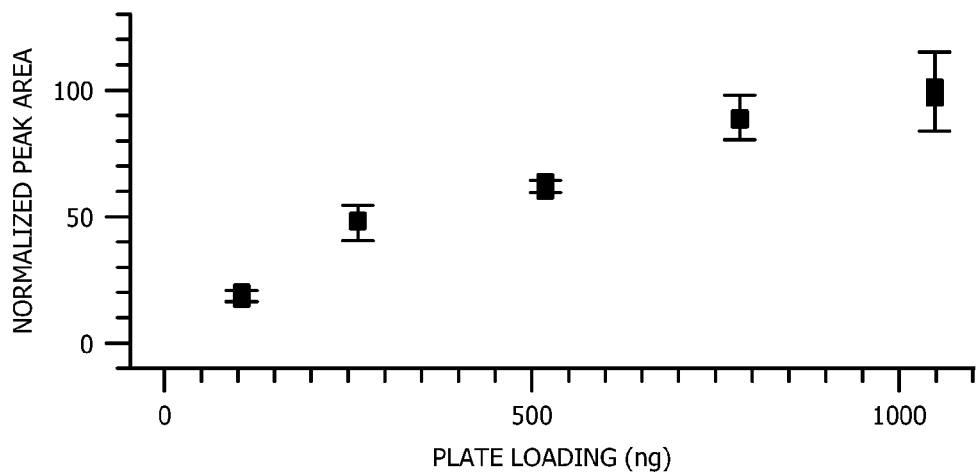
Figure 13C:
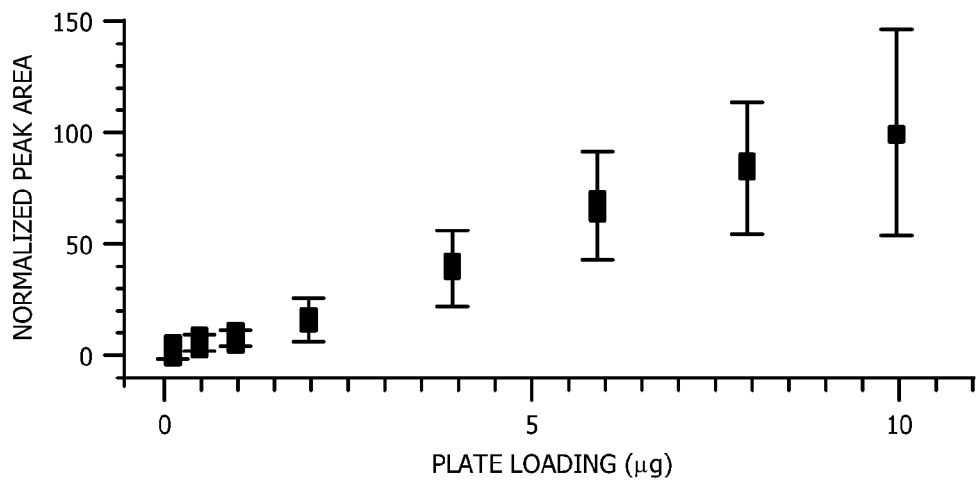

Effects of surface scan speed on analyte signal intensity were also investigated using the Test Dye Mixture V. The mixture was spotted (~1 μg spots with 5 mm spacing) and developed on an HPTLC plate. The peak height and area, and baseline peak width measured for surface surface scan speeds of 50 to 800 μm/s, with specific reference to the data obtained for the separated spots of Sudan red 7B, are shown in FIG. 12. The largest integrated peak area (SRM mode) was observed at the slowest scan speed (50 μm/s), with the peak area decreasing as the scan rate increased (FIG. 12(b)). The observed peak height reached a maximum plateau in the surface scan range from about 200-400 μm/s (FIG. 12(c)). Importantly, the observed mass spectral chronographic band widths (i.e., the time it takes to scan over a band) decreased with scan speed and correlated well with the predicted mass spectral band width values up to about 700 μm/s (FIG. 12(a)). The predicted mass spectral peak width, W, was calculated using Eqn. (3), where dB is the diameter of the analyte band determined visually, dP is the diameter of the probe, and r is the scan speed. The diameter of the probe was included Eqn. (3) to account for the TD of the analyte from the time that the near side of the probe first probe approaches the band until the far side of the probe passes completely through the band.

$$W = \frac{(d_B + d_P)}{r} \qquad \text{Eqn. (3)}$$

At the fastest scan speeds (~700 to 800 μm/s) the measured peak width reached a plateau and then began to diverge from the predicted peaks widths. This trend was attributed to the finite time necessary for the vapors from the desorbed species to pass into and through the interface and be detected by the instrument. The same set of experiments was carried out with the other two dyestuffs from the mixture, viz., solvent green 3, solvent blue 35, as well as with TNT. The same basic trends in peak height and peak width were also observed for these compounds.

The detection levels for this TLC/TD/I-MS technique were examined for three different compounds of greatly differing volatility, viz., TNT, acetaminophen and Sudan red 7B, listed in order of decreasing volatility. Aliquots (1 μL) of serial dilutions of TNT (0.001-1000 μg/mL), acetaminophen (0.001-1000 μg/mL), and Sudan red 7B (0.01-10000 μg/mL) were spotted on the appropriate HPTLC plates with 5 mm spacing and the plates developed as described in the Experimental section. The SRM transitions for these compounds were monitored in positive ion mode APCI while scanning the development lanes at 200 μm/s. The normalized peak areas measured versus plate loading are shown in FIG. 14.

These calibration data were evaluated using a least squares regression and fit the model A−bx+a, where A is the integrated peak area for a compound with mass x spotted on the TLC plate. The values b and a are the slope and intercept, respectively, of the calibration curve, and are presented for each compound in Table 1. From the linear calibration curves the detection limit was estimated ($3_{x/y}$/slope, where $s_{x/y}$, the standard error of the y value estimates, is assumed to approximate the standard deviation of the blank, $s_B$). This translates to detection levels of 24 ng (0.11 nmol), 370 ng (2.4 nmol), and 5700 ng (15 nmol) for TNT, acetaminophen and Sudan red 7B, respectively (Table 1, below). Thus the best detection level was obtained for the more volatile compound. This might be expected to be a general trend for a TD-based process, but other factors such as varying ionization efficiency among compound types will also affect detection levels. While these detection levels are not exceptional from a mass spectrometric point of view, they are within typical plate loadings for HPTLC (i.e., low μg levels), especially for the more volatile compounds.

TABLE 1

Figures of merit for the calibration curves and calculation of the detection limit for TLC/TD/I-MS

| Compound | TNT | Acetaminophen | Sudan red 7B |
|---|---|---|---|
| Calibration range, ng | 1-100 | 100-1000 | 125-10000 |
| Slope (b) ± Std dev | 2.17 ± 0.11 | 0.027 ± 0.003 | 1065 ± 87 |
| Intercept (a) ± Std dev | 1.0 ± 5.7 | 5.8 ± 1.6 | −212 ± 430 |
| $r^2$ | 0.95 | 0.89 | 0.78 |
| Standard error of the y value estimates, $S_{x/y}$ or $S_B$ | 17 | 3.3 | 2015 |
| Detection limit, ng (3 * $S_B$/b) | 24 | 370 | 5700 |
| Molecular weight, ng/nmol | 227 | 152 | 379 |
| Detection limit, nmol | 0.11 | 2.4 | 15 |

It is worth comparing how the signal levels vary for any one analyte when desorbed from different stationary phases and simply from a plain glass surface. This surface effect was illustrated for both melamine and TNT from glass-backed ProteoChrom HPTLC plates and glass-backed RP-18 HPTLC plates as well as from plain glass slides. Solutions of TNT (1000 μg/mL) and melamine (1000 μg/mL) were spotted in 1 μL, aliquots with 5 mm spacing on the respective plates and the HPTLC plates developed. The SRM transitions of TNT and melamine were monitored in positive ion mode APCI while scanning the development lanes (100 μm/s for TNT and 300 μm/s for melamine) relative to the heated probe. The largest in rated peak area for both melamine and TNT was observed when scanning across the analyte spots on plain glass slides and lowest when analyzing the developed spots on the NP plates. The different surfaces had a similar effect on the signal levels for both TNT and melamine. With both these relatively polar compounds, the signal from the plain glass surface was ~10 times greater than that from the NP plate and ~5 times greater than the signal level from the RP-18 plate. Obviously, the nature of the surface and particular analyte/surface interactions will influence the signal levels and limits of detection.

Selected Applications

Beyond the investigation of variable parameters and performance metrics discussed above, four mixtures of significantly different analyte types, viz., pharmaceuticals, solvent dyestuffs, herbicides and explosives, were examined to illustrate the prospective applicability of this proximal probe TD/I approach for coupling TLC and MS. The pharmaceutical application is described below in more detail.

Figure 14A:
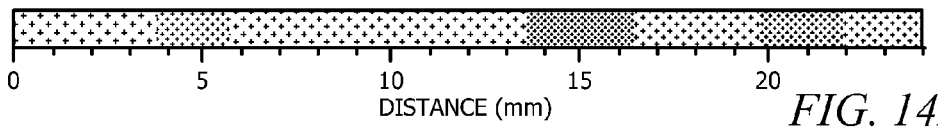
FIG. 14 is (a) a black and white photograph of glass-hacked normal-phase silica gel plate development lane showing the separated bands of caffeine, acetaminophen and aspirin, (b) the total ion current from full scan ESCi mode, and the individual extracted ion current chromatograms for (c) caffeine using APCI, (d) acetaminophen using APCI, and (e) aspirin using ESI.

An Extra Strength Excedrin tablet containing 65 mg of caffeine, 250 mg of acetaminophen, and 250 mg of aspirin was ground-up and the extract containing these three compounds was spotted as a series of tightly spaced spots containing 1.4 μg of material per spot and separated on a glass-backed NP HPTLC-HLF silica gel plate. FIG. 14(a) shows a picture of the development lane and the three separated bands. To acquire the mass spectral data shown in FIGS. 14(b)-14(e), the HPTLC plate was scanned (200 μm/s) from low to high RF (left to right in the picture) relative to the heated probe (350° C.) while full scan mass spectral data was acquired. In this case, two of the compounds, caffeine and acetaminophen, were most readily ionized and detected as the respective protonated molecules using positive ion mode APCI. The detection of aspirin was optimized by using ESI to form the sodiated adduct [M+Na]⁺. That being the case, positive ion mode ESCi was used for this experiment with the ion source switching scan to scan between APCI and ESI mode. To promote ESI, methanol was sprayed through the ESI probe at a flow rate of 60 μL/min. The averaged, background-subtracted mass spectra obtained while scanning the respective bands are shown as insets in FIGS. 14(c)-14(e) for caffeine ([M+Na]⁺, m/z 195), acetaminophen ([M+Na]⁺, m/z 152), and aspirin ([M+Na]⁺, m/z 203), respectively. This group of compounds in particular highlights the versatility of the technique by utilizing the APCI and ESI sources in tandem for the detection of analytes with varying ionization requirements.

Using this set of data, the chromatographic resolutions obtained by HPTLC and MS were also compared. The chromatographic resolution, R, of two chromatographic bands was calculated using Eqn. (4), where d is the distance between the centers of the bands, and W1 and W2 are the widths of the two bands.

$$R = \frac{d}{(W_1 + W_2)/2} \quad \text{Eqn. (4)}$$

From the optical data obtained using the photograph of the plate in FIG. 15(a), the chromatographic resolution for the TLC separation of caffeine (C) and acetaminophen (A) was calculated as $(R_{C/A})=3.64$ and for acetaminophen (A) and aspirin (S) as $(R_{A/S})=1.54$. From the mass spectral data we calculated $(R_{C/A})=3.42$ and $(R_{A/S})=1.38$, or about 6-10% lower than the apparent chromatographic resolution. This was considered to represent good agreement between the two data sets (optical and MS) given the difficulty in accurately determining the extent of the bands on the plate by simple visual observation.

Figure 14B:
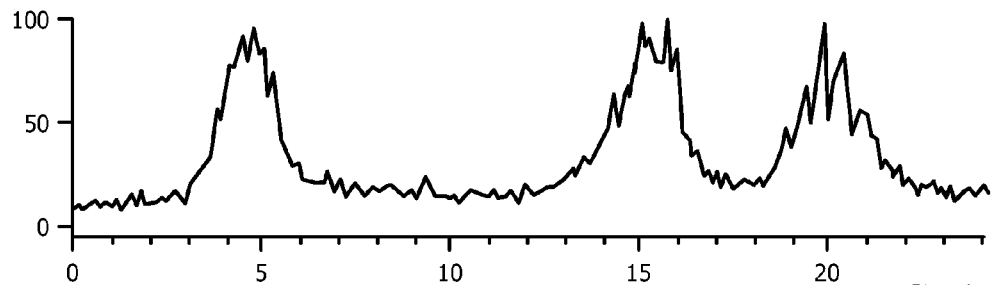
Figure 14C:
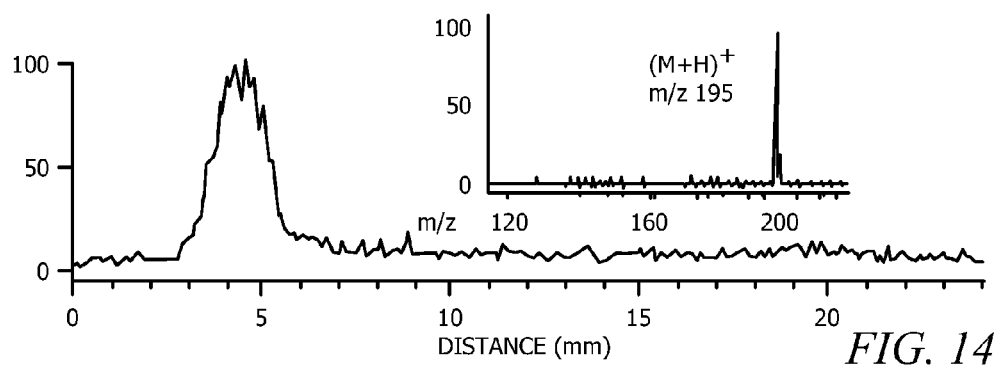
Figure 14D:
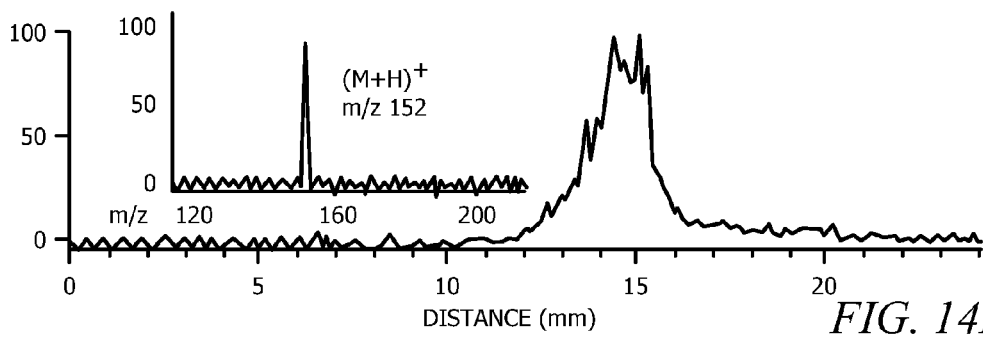
Figure 14E:
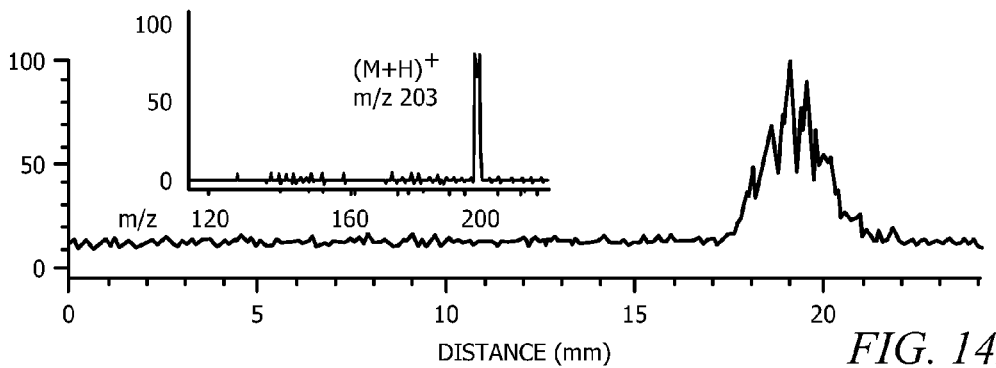

FIG. 14(a) is a black and white photograph of glass-backed normal-phase silica gel plate (HPTLC-HLF) development lane showing the separated bands of a three-component Excedrin mixture containing caffeine, acetaminophen and aspirin. FIG. 14(b) shows the total ion current from full scan ESCi mode, while FIG. 14(c), (d) and (e) show individual extracted ion current chromatograms for (c) caffeine (m/z 195) using APCI, (d) acetaminophen (m/z 152) using APCI, and (e) aspirin (m/z 203) using ESL respectively. Also shown in panels for FIGS. 14(c)-(e) are the averaged, background-subtracted full scan mass spectra (m/z 115-215) for the respective compounds. The development lane was scanned at 200 mm/s relative to the heated probe (350° C.). The solution containing caffeine, acetaminophen and aspirin was spotted as a band (a closely spaced series of 1.4 mg loadings) on the HPTLC plate.

The data demonstrate that a simple proximal probe thermal desorption/ionization approach for coupling TLC and MS. The experimental setup was optimized for probe and plate positioning relative to the inlet into the ionization region of the mass spectrometer as well for the variable parameters of probe temperature, gas flow into the mass spectrometer and surface scan speed using single lane scans for selected analytes developed on various HPTLC plates. The experiments showed that the compound band widths determined by mass spectrometry matched the chromatographic band width up to surface scan speeds of about 700 mm/s.

The wide ranging applicability of this TLC/TD/I-MS technique was demonstrated using compounds with very disparate volatilities and ionization behavior, including dyestuffs, herbicides, explosives and pharmaceuticals. The use of a commercial ionization source capable of operation in ESI, APCI or ESCi mode added to the usefulness of the present approach. The ESCi approach might be expected to be particularly useful in a discovery mode where the nature of the analytes and the best ionization method to utilize may not be known.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A method of analyzing a chemical composition of a specimen, comprising:
   providing a specimen for evaluation and a thermal desorption probe, having a thermally active tip, wherein an apex of said thermally active tip has a radius of 250 nm of less;
   thermally desorbing an analyte from a target site at atmospheric pressure of said specimen using said thermally active tip to form a gaseous analyte, wherein said thermally desorbing step comprises:
   heating said thermally active tip to above 200° C., and positioning said target site and said thermally active tip such that said heating step forms said gaseous analyte;
   ionizing said gaseous analyte to form an ionized analyte; and
   analyzing a chemical composition of said ionized analyte.

2. The method according to claim 1, further comprising:
   determining a predetermined sampling path comprising a plurality of target sites prior to said first thermal desorption step, and
   sequentially articulating said thermally active tip along said predetermined sampling path and repeating said thermally desorbing, ionizing and analyzing steps for each target site.

3. The method according to claim 2, wherein said determining step comprises analyzing a topography of said specimen utilizing said thermal desorption probe in an atomic force microscopy mode.

4. The method according to claim 3, wherein said thermal desorption probe is maintained in contact with said specimen while said thermal desorption probe is sequentially articulated along said sampling path.

5. The method according to claim 3, wherein said thermal desorption probe is intermittently removed from contact with said specimen between said target sites.

6. The method according to claim 3, wherein said thermal desorption probe does not contact said specimen during at least one of said thermal desorbing steps.

7. The method according to claim 3, further comprising: mapping a property of a chemical component for each of said target sites.

8. The method according to claim 1, further comprising maintaining said gaseous analyte above a condensation temperature between said thermal desorption step and said ionizing step.

9. The method according to claim 1, wherein said analyzing step comprises evaluating said ionized analyte with a mass spectrometer.

10. The method according to claim 1, wherein said ionizing step comprises passing said gaseous analyte through an ionization source.

11. The method according to claim 1, wherein said thermal desorbing step comprises volatizing said analyte.

12. A system for analyzing a chemical composition of a specimen, comprising:
    a specimen stage for supporting a specimen;
    a thermal desorption probe, having a thermally active tip, wherein an apex of said thermally active tip has a radius of 250 nm or less;
    a collection device arranged to capture an gaseous analyte desorbed from a specimen by said thermal desorption probe;
    a heating device for maintaining a temperature of a gaseous analyte above a condensation temperature within said collection device;
    an analytical instrument for determining a chemical composition of an analyte, wherein an outlet of said collection device is coupled to an inlet of said analytical instrument;
    a stepper mechanism configured to provide relative motion between said specimen stage and said thermal desorption probe; and
    a controller configured for (i) actuating said stepper mechanism to sequentially articulate said thermal desorption probe and/or said sample stage along a predetermined sampling path comprising a plurality of target sites, and (ii) heating said thermally active tip to a temperature greater than 200° C. while proximate the target site at atmospheric pressure in order to cause analytes at the plurality of target sites to form gaseous analytes.

13. The system according to claim 12, wherein said controller is configured for locally heating said thermally active tip to a temperature greater than 350° C.

14. The system according to claim 12, wherein said controller is configured for causing said stepper mechanism to bring said thermal desorption probe into contact with a specimen at each of said target sites.

15. The system according to claim 14, wherein said controller is configured for removing said thermal desorption probe from contact with a specimen while said thermal desorption probe is articulated along said sampling path.

16. The system according to claim 14, wherein said controller is configured for articulating said thermal desorption probe along said sampling path in a non-contact mode.

17. The system according to claim 14, wherein a chemical composition of an analyte desorbed at each of said plurality of target sites is determined by said analytical instrument and a plot of said data is generated.

18. The system according to claim 12, wherein a distance between said collection device and said thermally active tip is less than 0.1 mm.

19. The system according to claim 12, wherein said analytical instrument is a mass spectrometer, an ionization source, a separation method, or a combination thereof.

* * * * *